United States Patent [19]
Endo et al.

[11] Patent Number: 5,570,224
[45] Date of Patent: Oct. 29, 1996

[54] OPTICAL SCANNING APPARATUS

[75] Inventors: Osamu Endo; Yoshinori Hayashi, both of Kawasaki; Koji Ichimiya, Yokohama; Takayuki Ohsawa, Funabashi, all of Japan

[73] Assignee: Ricoh Company, Ltd., Tokyo, Japan

[21] Appl. No.: 223,849

[22] Filed: Apr. 6, 1994

[30] Foreign Application Priority Data

| Apr. 8, 1993 | [JP] | Japan | 5-082045 |
| Jun. 28, 1993 | [JP] | Japan | 5-157648 |
| Jan. 10, 1994 | [JP] | Japan | 6-000735 |

[51] Int. Cl.⁶ .................................................. G02B 26/08
[52] U.S. Cl. .................... 359/212; 359/196; 359/205; 347/256
[58] Field of Search .................... 359/196, 215, 359/216, 217, 218, 232, 233, 738, 739, 205–207, 197, 201; 346/108, 160; 347/225, 236, 246, 252, 253, 254, 256

[56] References Cited

U.S. PATENT DOCUMENTS

| 1,652,271 | 5/1921 | Cooke | 359/232 |
| 3,537,777 | 11/1970 | Flynn | 359/232 |
| 4,636,071 | 1/1987 | Lowe et al. | 356/73.1 |
| 4,941,719 | 7/1990 | Hisada et al. | 359/205 |

FOREIGN PATENT DOCUMENTS

| 0176603 | 10/1983 | Japan | 359/232 |
| 63-316816 | 12/1988 | Japan . | |
| 2-196209 | 8/1990 | Japan . | |
| 0226222 | 9/1990 | Japan | 359/207 |

*Primary Examiner*—Paul M. Dzierzynski
*Assistant Examiner*—Darren E. Schuberg
*Attorney, Agent, or Firm*—Cooper & Dunham LLP

[57] ABSTRACT

An optical scanning apparatus includes: a light source for emitting a laser light ray; a cylinder lens for converting the laser light ray into a first convergent light ray that converges only in a sub-scanning direction and remains unchanged in a main scanning direction; a deflection unit for deflecting the first convergent light ray from the cylinder lens; a focusing unit for converting the deflected light ray into a second convergent light ray that converges in the main scanning direction, and for focusing the second convergent light ray on a scanned surface as a light spot; an aperture unit, arranged between the light source and the deflection unit, for blocking an outer peripheral portion of the laser light ray and for restricting a width of the laser light ray in the sub-scanning direction to a first width of an aperture of the aperture unit; and an adjusting unit for adjusting the first width of the aperture of the aperture unit so as to eliminate a deviation of the diameter of the light spot on the scanned surface from a design value.

18 Claims, 15 Drawing Sheets

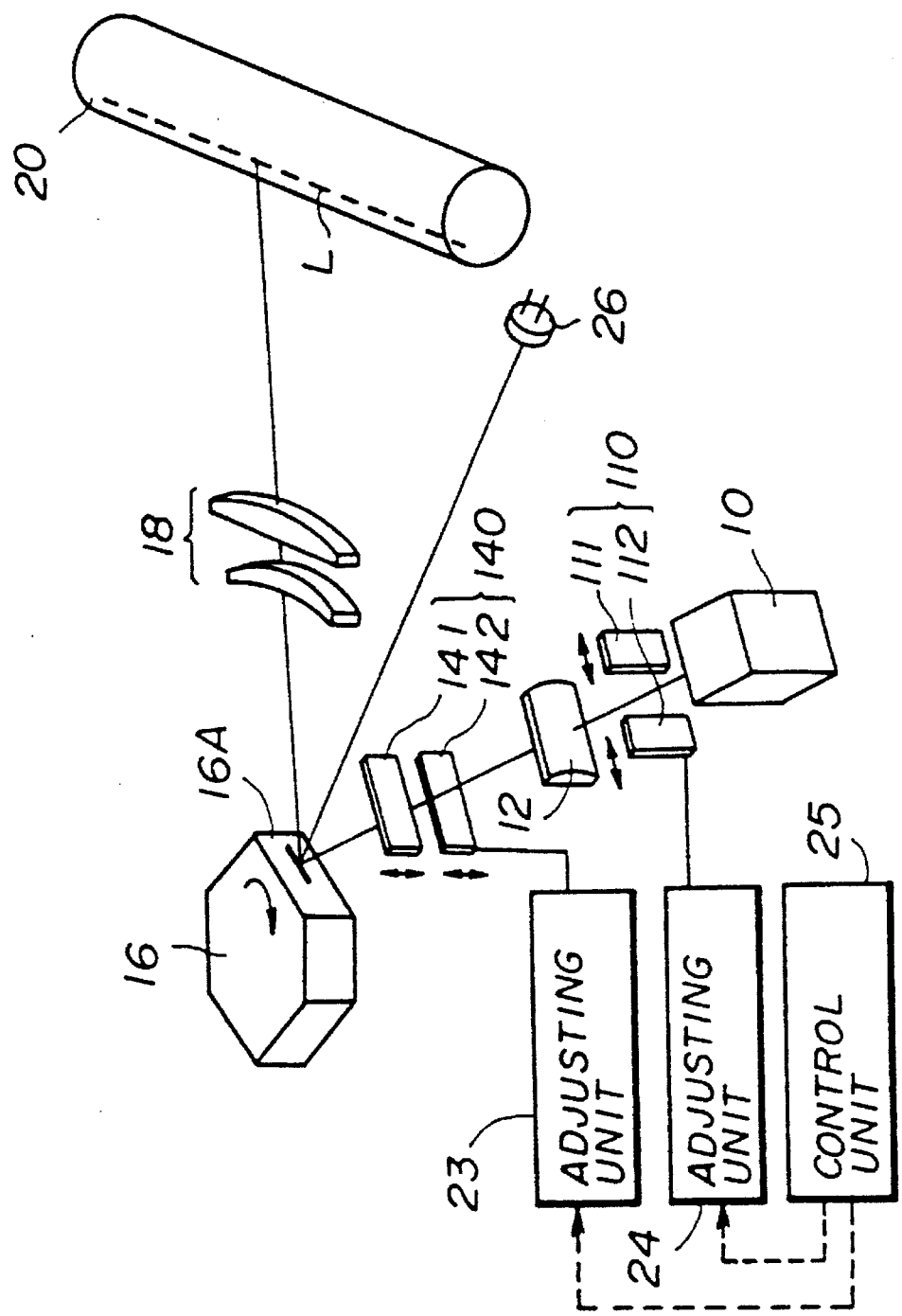

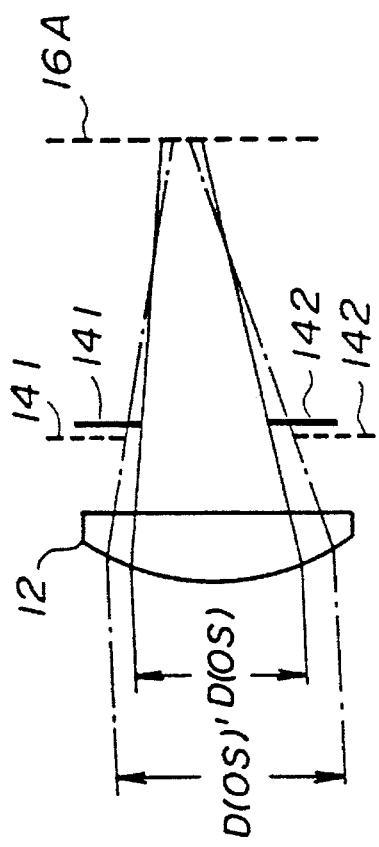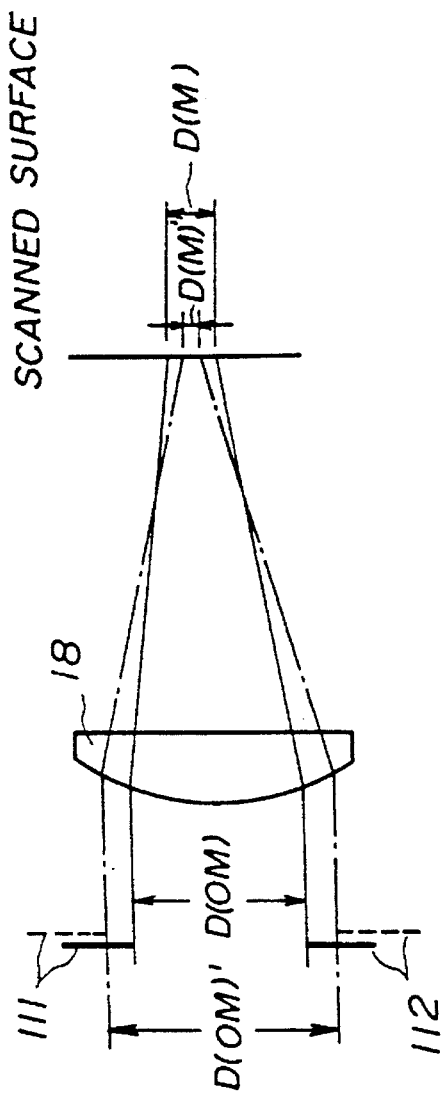

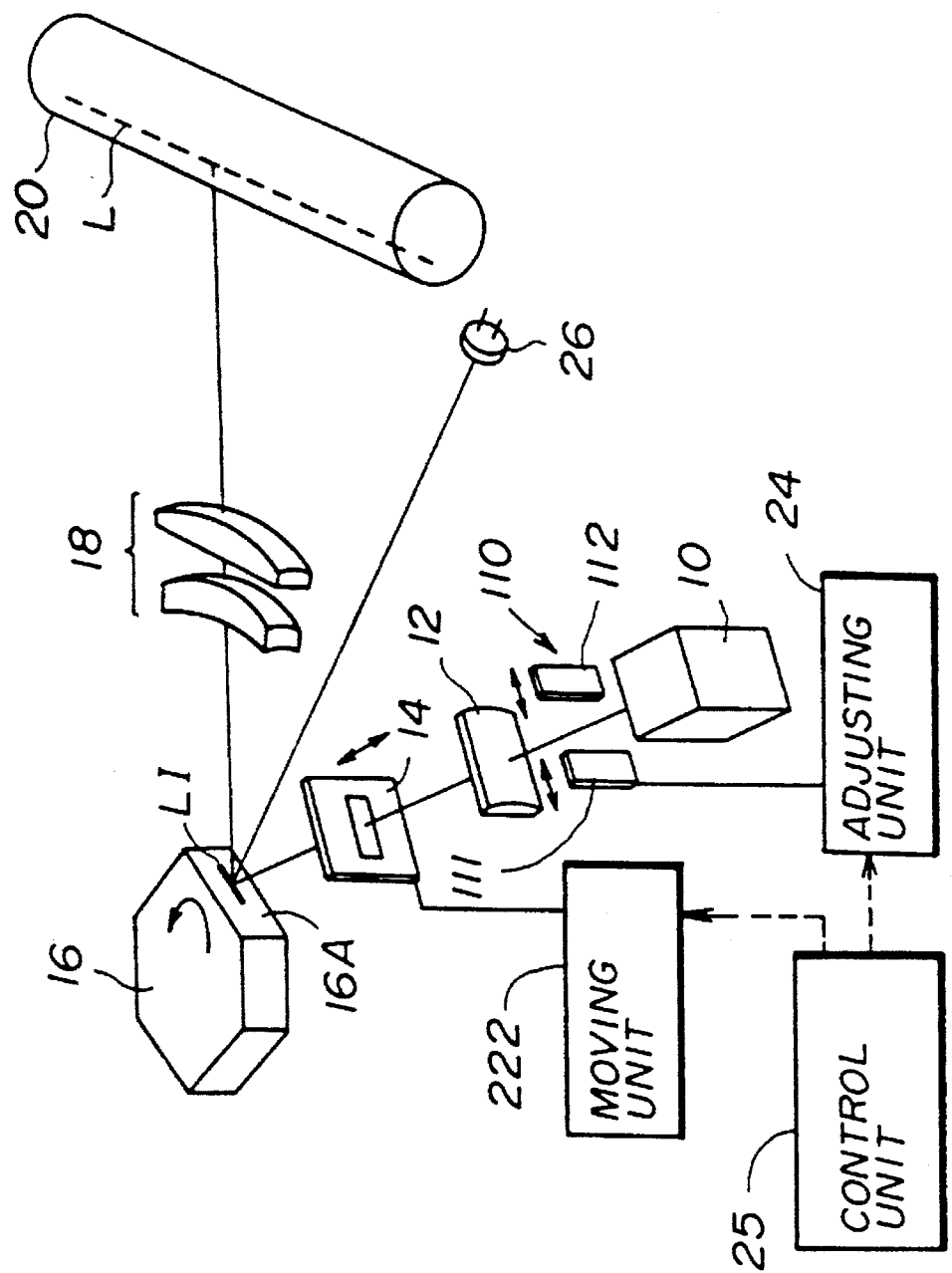

OPTICAL SCANNING APPARATUS

BACKGROUND OF THE INVENTION

The present invention generally relates to an optical scanning apparatus, and more particularly to an optical scanning apparatus of an image forming system for eliminating a deviation of a diameter of a light spot from a design value.

An optical scanning apparatus of an image forming system such as a laser beam printer is known. In the optical scanning apparatus, a laser light ray emitted from a laser light source is deflected by a rotary deflector, and a deflected light ray is focused on a recording medium as a light spot by means of an optical focusing system. By the rotating movement of the rotary deflector, the light ray deflected from the deflector moves in a main scanning direction so that the recording medium is scanned by the light spot along a main scanning line to record an image.

For recent optical scanning apparatuses, the capability of recording an image with higher dot density is needed. In order to realize the recording of an image with higher dot density, it is necessary to make the diameter of the light spot on the recording medium as small as possible. The diameter of the light spot focused on the recording medium is dependent on the optical parts of the optical scanning apparatus arranged on the optical path from the light source to the scanned surface of the recording medium. Thus, it is necessary that the optical parts of the optical scanning apparatus are designed and assembled in a manner such that a light spot having a diameter as near a design value as possible is formed on the recording medium.

However, it is unavoidable that the optical parts of the optical scanning apparatus have the production errors and the assembly errors. The diameter of the light spot on the recording medium is considerably influenced by the production errors of the optical parts and the assembly errors thereof. Therefore, in order to obtain a desired light spot diameter, some optical scanning devices including a mechanism for adjusting the diameter of the light spot on the recording medium have been proposed.

Japanese Laid-Open Patent Application No. 63-316816 discloses a proposed mechanism for adjusting the diameter of the light spot by using a zoom optical system. However, the cost of the proposed mechanism is considerably high, and it is difficult to make the proposed mechanism viable for optical scanning devices for practical uses.

Japanese Laid-Open Patent Application No. 2-196209 discloses a proposed mechanism for changing the diameter of an aperture through which a light ray from a light source is passed. The proposed mechanism requires a complicated structure to change the diameter of the aperture, and it is difficult to make the proposed mechanism viable for optical scanning devices for practical uses.

In addition, a recent optical scanning apparatus includes a cylinder lens for converting a collimated light ray from the light source into a convergent light ray converging only in a sub-scanning direction so that a line image extending in a main scanning direction is formed on a reflection surface of the rotary deflector. The cylinder lens is provided within the optical scanning apparatus for eliminating the inclination of the reflection surface from the intended direction. However, it is unavoidable that the optical scanning apparatus is provided with an optical focusing system, such as an fΘ lens, which has a curvature of field. The curvature of field of the optical focusing system influences the diameter of the light spot focused on the recording medium, and the light spot diameter often varies in both the main scanning direction and the sub-scanning direction due to the curvature of the field. For most of the known optical scanning devices, it is difficult to correct the light spot diameter in both the main scanning direction and the sub-scanning direction.

In order to achieve the recording of an image with higher dot density, it is necessary for the optical scanning apparatus to eliminate the variations of the light spot diameter in both the main scanning direction and the sub-scanning direction due to the curvature of the field of the optical focusing system. An electrical control of a writing signal for recording a dot to the recording medium can be used to correct the variation of the light spot diameter in the main scanning direction. However, the electrical control mentioned above is not effective for correcting the variation of the light spot diameter in the sub-scanning direction.

In order for correcting the diameter of the light spot in the sub-scanning direction which diameter may vary due to the curvature of the field of the optical focusing system, a mechanism for moving the cylinder lens relative to the light source in the optical path direction in accordance with the curvature of the field concerning the sub-scanning direction has been proposed. However, the weight of the cylinder lens is considerably great when a high-speed image recording is performed, and it is difficult for the proposed mechanism to accurately move the cylinder lens relative to the light source at a high speed so as to eliminate the variation of the light spot diameter in the sub-scanning direction.

SUMMARY OF THE INVENTION

Accordingly, it is a general object of the present invention to provide an improved optical scanning apparatus in which the above mentioned problems are eliminated.

Another, more specific object of the present invention is to provide an optical scanning apparatus which has a simple structure and can easily and stably adjust the light spot diameter both in the main scanning direction and the sub-scanning direction so as to eliminate the deviation of the light spot diameter from a design value.

Still another object of the present invention is to provide an optical scanning apparatus which can easily and stably eliminate the variations of the light spot diameter due to the curvature of field even when a high-speed image recording is performed.

The other object of the present invention is to provide an optical scanning apparatus which has a simple structure and can easily and stably vary the light spot diameter and shape in the sub-scanning direction.

The other object of the present invention is to provide an optical scanning apparatus which can easily and stably correct the light spot diameters in the main scanning direction and the sub scanning direction into appropriate values.

The above mentioned objects of the present invention are achieved by an optical scanning apparatus which includes: a light source for emitting a laser light ray; a cylinder lens for converting the laser light ray from the light source into a first convergent light ray, the first convergent light ray converging only in a sub-scanning direction and remaining unchanged in a main scanning direction; a deflection unit for deflecting the first convergent light ray from the cylinder lens; a focusing unit for converting the deflected light ray deflected by the deflection unit into a second convergent light ray, the second convergent light ray converging in the main scanning direction, and for focusing the second convergent light ray on a scanned surface as a light spot; an aperture unit, arranged between the light source and the deflection unit, for blocking an outer peripheral portion of the laser light ray from the light source and for restricting a width of the laser light ray in the sub-scanning direction to a first width of an aperture of the aperture unit; and an adjusting unit for adjusting the first width of the aperture of the aperture unit, so as to eliminate a deviation of the diameter of the light spot on the scanned surface from a design value.

According to the present invention, it is possible for the optical scanning apparatus to easily and stably eliminate the deviation of the light spot diameter from the design value due to the production errors of the optical parts or the assembly errors thereof. As the aperture unit having a small weight can be easily produced, it is possible that the optical scanning apparatus of the present invention easily and stably eliminate the variations of the light spot diameter due to the curvature of field by moving the aperture unit relative to the light source in the optical path direction, even when a high-speed image recording is performed.

In addition, it is possible that the optical scanning apparatus of the present invention easily and stably vary the light spot diameter and shape in the sub-scanning direction. In addition, according to the present invention, it is possible that the optical scanning apparatus easily and stably correct the light spot diameters in the main scanning direction and the sub-scanning direction into appropriate values.

BRIEF DESCRIPTION OF THE DRAWINGS

The above and other objects, features and advantages of the present invention will be more apparent from the following detailed description when read in conjunction with the accompanying drawings in which:

FIGS. 2A through 2C are diagrams showing a second embodiment of the optical scanning apparatus according to the present invention;

FIG. 3 is a diagram showing a modification of the optical scanning apparatus shown in FIG. 2A through 2C;

DESCRIPTION OF THE PREFERRED EMBODIMENTS

A description will now be given, with reference to FIGS. 1A through 1D, of a first embodiment of the optical scanning apparatus according to the present invention.

Figure 1A:
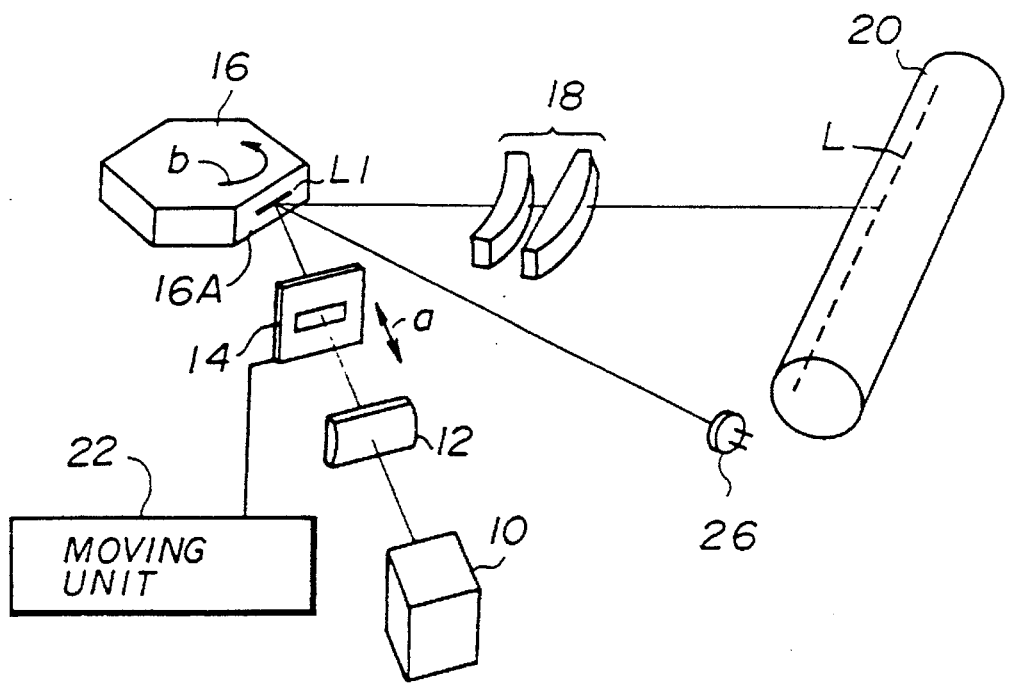
FIGS. 1A through 1D are diagrams showing a first embodiment of the optical scanning apparatus according to the present invention.

FIG. 1A shows the first embodiment of the optical scanning apparatus. The optical scanning apparatus in FIG. 1A includes a laser light source 10, a cylinder lens 12, an aperture unit 14, a rotary polygon mirror 16, an fΘ lens 18, and a photosensitive drum 20.

The laser light source 10 in FIG. 1A has a semiconductor laser for emitting a laser light ray, and a coupling lens for converting a divergent laser light ray from the semiconductor laser into a collimated light ray. Thus, the laser light source 10 emits the collimated light ray toward the polygon mirror 16 through the cylinder lens 12 and the aperture unit 14.

Alternatively, a light source unit which is different from the laser light source 10 and emits either a divergent light ray or a convergent light ray may be used instead.

The cylinder lens 12 in FIG. 1A converts the light ray from the laser light source 10 into a convergent light ray, and this convergent light ray passes through the aperture unit 14 to the rotary polygon mirror 16. As shown in FIG. 1C, the light ray from the light source 10 converges only in a sub-scanning direction by means of the cylinder lens 12. In other words, the collimated light ray from the cylinder lens 12 remains unchanged in a main scanning direction but it is made convergent in the sub-scanning direction. The sub-scanning direction corresponds to the vertical, up-down direction in FIG. 1C, and the main scanning direction corresponds to the direction perpendicular to the sheet on which the drawing of FIG. 1C is shown. The cylinder lens 12 may be either a single cylinder lens or a combination of two or more cylinder lenses.

The rotary polygon mirror 16 in FIG. 1A is an optical deflector having a reflection surface 16A for reflecting the incoming light toward the photosensitive drum 20 whose direction is different from the incoming light direction. The reflection surface 16A is one of a plurality of surfaces of the polygon mirror 16, and the light ray emitted from the light source 10 strikes the reflection surface 16A of the rotary polygon mirror 16. By means of the light ray passed through the aperture unit 14, a line image LI is formed on the reflection surface 16A, and this line image LI is an image extending in the main scanning direction. The optical deflector in FIG. 1A may be a rotary polygon mirror, a galvanomirror, or the like.

The light ray deflected by the polygon mirror 16 enters the fΘ lens 18 and is directed to the photosensitive drum 20. The fΘ lens 18 is an optical focusing unit for converting the light ray deflected from the polygon mirror 16 into a convergent light ray that is focused on the photosensitive drum 20 as a light spot thereon. As the polygon mirror 16 rotates in a rotating direction indicated by an arrow "b" in FIG. 1A, the light ray deflected from the polygon mirror 16 scans the photosensitive drum 20 at a constant speed along a main scanning line L which is indicated as a dotted line in FIG. 1A. The main scanning line L is the trace of the light spot focused on the photosensitive drum 20 when the polygon mirror 16 rotates. An imaginary surface tangential to the photosensitive drum 20 on the main scanning line L is called the scanned surface 19. The main scanning direction mentioned above corresponds to the direction of this main scanning line L on the photosensitive drum 20.

When the optical deflector of the optical scanning apparatus is a galvano-mirror, an f·sin Θ lens can be used as the optical focusing unit of the apparatus. When the optical deflector is a rotary polygon mirror, an fΘ lens can be used as the optical focusing unit of the apparatus.

In addition, the optical scanning apparatus shown in FIG. 1A includes a photosensor 26 separate from the photosensitive drum 20. At the start of each of the main scannings on the photosensitive drum 20 along the main scanning line L, the light ray deflected from the rotary polygon mirror 16 enters the photosensor 26, and the photosensor 26 outputs a sync signal indicating the timing of the start of each main scanning. By using a clock signal whose phase is synchronized to the sync signal output by the photosensor 26, the time of writing one dot to the photosensitive drum 20 using the light ray from the light source 10 is determined. In other words, the pixel clock on which the time of writing one dot to the photosensitive drum 20 is based is determined in accordance with the sync signal of the photosensor 26.

The aperture unit 14 is arranged on the optical path between the cylinder lens 12 and the polygon mirror 16. The aperture unit 14 has an aperture extending in the main scanning direction and having a certain amount of the width in the sub-scanning direction. The aperture unit 14 blocks an outer peripheral portion of the light ray from the cylinder lens 12 and restricts a width of the light ray in the main scanning direction and a width of the light ray in the sub-scanning direction to the main-scanning-direction width of the aperture and the sub-scanning-direction width thereof respectively. Only the inner portion of the light ray, passed through the aperture of the aperture unit 14, enters the reflection surface 16A of the polygon mirror 16. As described above, the line LI, which extends in the main scanning direction, is formed on the reflection surface 16A by the light ray from the aperture unit 14. The aperture unit 14 serves to adjust the shape of the light spot on the scanned surface of the photosensitive drum 20.

The aperture unit 14 in FIG. 1A may be made from a thin metal sheet, and the aperture is formed by perforating the middle portion of the metal sheet. Alternatively, the aperture unit 14 may be made from a glass sheet, the glass sheet including a slit-like transparent portion in the middle thereof and a reflective opaque portion in the peripheral portion of the glass sheet. Such an aperture unit may be used instead in the optical scanning apparatus.

Figure 1D:
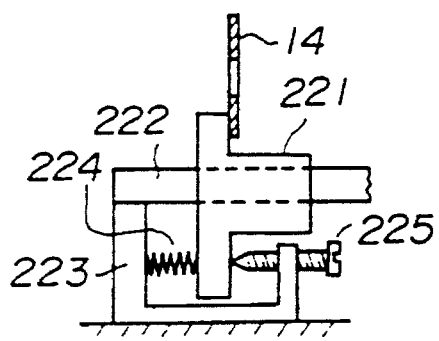

FIG. 1D shows the aperture unit 14 of the optical scanning apparatus in FIG. 1A. The position of the aperture unit 14 relative to the light source in the optical path direction is adjusted by means of a moving unit 22. As shown in FIG. 1D, the aperture unit 14 is fixed to a movable supporting member 221 with an adhesive agent. The supporting member 221 is fitted in a guide member 222, and the supporting member 221 to which the aperture unit 14 is secured can be moved relative to the light source along the guide member 22 by means of the moving unit 22.

The guide member 222 in FIG. 1D is fixed to a stationary retaining member 223 which is permanently fixed to the frame of the image forming system. A compression spring 224 is arranged between the retaining member 223 and the supporting member 221. One end of the spring 224 is fixed to the retaining member 223, and the supporting member 221 is biased toward the cylinder lens 12 by the other end of the spring 224. A screw 225 is threaded in a vertical wall of the retaining member 223, and this screw 225 has a leading end which is brought into contact with the supporting member 221 from the direction opposite to the biasing direction of the spring 224.

Accordingly, by turning the screw 225 clockwise (or in the tightening direction) to the wall of the retaining member 223, the supporting member 221 can be moved toward the cylinder lens 12. By turning the screw 225 counterclockwise (or in the loosening direction) to the wall of the retaining member 223, the supporting member 221 can be moved away from the cylinder lens 12. As the aperture unit 14 is fixed to the supporting member 221, it is possible to change the position of the aperture unit 14 relative to the light source in the optical path direction by turning the screw 225 clockwise or counterclockwise by means of the moving unit 22.

FIG. 1C shows an optical path of the optical scanning apparatus in FIG. 1A. In FIG. 1C, the optical path from the light source 10 to the scanned surface 19 of the photosensitive drum 20 is developed into a linear optical path. When the aperture unit 14 is located at the position as indicated in FIG. 1C, the outer peripheral portions (indicated by the dotted lines) of the light ray from the light source 10 are blocked by the aperture unit 14, and only the inner portions (indicated by the solid lines) of the light ray enter the reflection surface 16A. Thus, when viewed from the reflection surface 16A, the light ray before the entry to the cylinder lens 12 has a diameter D(0S) in the sub-scanning direction.

The light ray entering the reflection surface 16A has a diameter D(1S) on the reflection surface 16A in the sub-scanning direction which diameter is represented as follows:

$$D(1S)=K \cdot l \cdot fcy/[\pi \cdot D(0S)]$$

where fcy is the focal length of the cylinder lens 12 with respect to the sub-scanning direction, L is the wavelength of the laser light, and K is a given coefficient.

The light ray striking the scanned surface 19 of the photosensitive drum 20 has a diameter D(2S) on the scanned surface 19 in the sub-scanning direction which diameter is represented as follows:

$$D(2S)=\beta \cdot D(1S)=K \cdot \beta \cdot l \cdot fcy/[\pi \cdot D(0S)]$$

where β is the lateral magnification of the fΘ lens 18 with respect to the sub-scanning direction. As being apparent from the above formula, the diameter D(2S) of the light ray striking the scanned surface 19 and the diameter D(0S) of the light ray before the entry to the cylinder lens 12 are in inverse proportion. Thus, it is possible to vary the diameter D(2S) of the light ray on the scanned surface 16A by changing the before-entry diameter D(0S) on the cylinder lens 12. More specifically, the diameter D(2S) increases if the diameter D(0S) is reduced, and the diameter D(2S) decreases if the diameter D(0S) is enlarged. Also, the diameter D(0S) can be adjusted by changing the position of the aperture unit 14 relative to the light source 10.

Figure 1B:
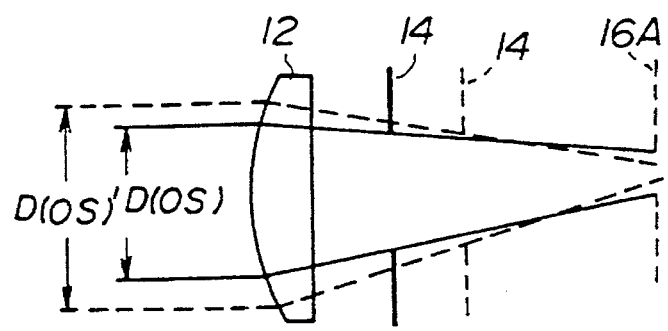
Figure 1C:
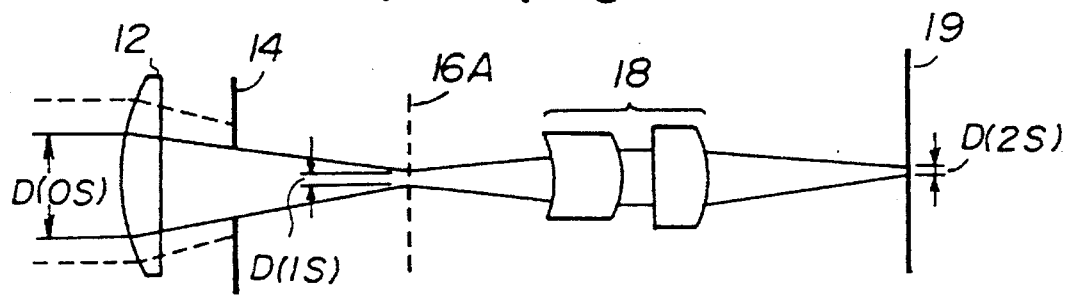

FIG. 1B shows the change of the diameter D(0S) when the aperture unit 14 is moved away from the cylinder lens 12 by the moving unit 22. When the aperture unit 14 is moved from a position indicated by the solid line to a position indicated by the dotted line, the diameter D(0S) corresponding to the solid-line position is changed to an enlarged diameter D(0S)' corresponding to the dotted-line position. That is, if the aperture unit 14 is moved away from the cylinder lens 12, the diameter D(2S) of the light ray on the scanned surface of the photosensitive drum 20 in the sub-scanning direction can be changed to a smaller diameter. On the other hand, if the aperture unit 14 is moved toward the cylinder lens 12 (or in the opposite direction), the diameter D(2S) of the light ray on the scanned surface of the photosensitive drum 20 can be changed to a greater diameter.

Accordingly, the deviation of the sub-scanning-direction light spot diameter from the design value due to the production errors of the optical parts and the assembly errors thereof can be eliminated by adjusting the position of the aperture unit 14 relative to the light source 10 in the optical path direction.

Next, a description will be given, with reference to FIGS. 2A through 2C, of a second embodiment of the optical scanning apparatus according to the present invention. FIGS. 2A through 2C show the second embodiment of the optical scanning apparatus. In FIGS. 2A through 2C, the parts which are the same as corresponding parts shown in FIGS. 1A through 1D are designated by the same reference numerals.

The optical scanning apparatus shown in FIG. 2A includes a first aperture unit 140 and a second aperture unit 110. The other parts of the optical scanning apparatus in FIG. 2A are the same as corresponding parts in FIG. 1A, and a description thereof will be omitted.

The first aperture unit 140 of the optical scanning apparatus in FIG. 2A has a pair of shading plates 141 and 142 which form a first aperture extending in the main scanning direction. The vertical width of the first aperture, that is the distance between the two shading plates 141 and 142 in the sub-scanning direction, can be adjusted by an adjusting unit 23. The second aperture unit 110 of the optical scanning apparatus has a pair of shading plates 111 and 112 which form a second aperture extending in the sub-scanning direction. The horizontal width of the second aperture, that is the distance between the two shading plates 111 and 112 in the main scanning direction, can be adjusted by an adjusting unit 24.

The adjusting unit 23 is a first mechanism for adjusting the vertical width of the first aperture of the first aperture unit 140 in the sub-scanning direction by moving the shading plates 141 and 42 in the directions opposite to each other. The adjusting unit 24 is a second mechanism for adjusting the horizontal width of the second aperture of the second aperture unit 110 in the main scanning direction by moving the shading plates 111 and 112 in the directions opposite to each other. Both the adjusting units 23 and 24 can be made by making use of, for example, a moving mechanism which is similar to that shown in FIG. 1D.

FIG. 2B shows the operation of the first aperture unit 140 in FIG. 2A. When the shading plates 141 and 142 are moved away from each other in the opposite directions (parallel to the sub-scanning direction) by the adjusting unit 23, for example, from positions indicated by the solid lines in FIG. 2B to positions indicated by the dotted lines in FIG. 2B, the diameter D(0S) corresponding to the solid-line positions is changed to an enlarged diameter D(0S)' corresponding to the dotted-line positions. That is, if the shading plates 141 and 142 are moved away from each other, the diameter D(2S) of the light ray on the scanned surface of the photosensitive drum 20 in the sub-scanning direction can be changed to a smaller diameter. On the other hand, if the shading plates 141 and 142 are moved in the approaching directions, the diameter D(2S) of the light spot on the scanned surface of the photosensitive drum 20 can be changed to a greater diameter.

In order to adjust the diameter D(2S) of the light spot on the scanned surface 19, it is unnecessary to change the position of the first aperture unit 140 relative to the light source 10 in the optical path direction. Thus, the first aperture unit 140 can be arranged within the optical scanning apparatus either between the rotary polygon mirror 16 and the cylinder lens 12 or between the laser light source 10 and the cylinder lens 12.

FIG. 2C shows the operation of the second aperture unit in FIG. 2A. When the shading plates 111 and 112 of the second aperture unit 110 are placed at positions indicated by the solid lines in FIG. 2C, the light ray from the polygon mirror 16 has a diameter D(0M) before the entry to the fΘ lens 18 in the main scanning direction.

The light ray striking the scanned surface 19 at this time has a diameter D(M) on the scanned surface 19 in the main scanning direction which diameter is represented as follows:

$$D(M)=K'\cdot l\cdot f/[\pi\cdot D(0M)]$$

where f is the focal length of the fΘ lens 18 with respect to the main scanning direction, L is the wavelength of the laser light, and K' is a given coefficient. As being apparent from the above formula, the diameter D(M) of the light ray striking the scanned surface 19 and the diameter D(0M) of the light before the entry to the fΘ lens 18 are in inverse proportion.

When the shading plates 111 and 112 are moved away from each other to positions indicated by the dotted lines in FIG. 2C, the diameter of the light ray before the entry to the fΘ lens 18 is changed to a greater diameter D(0M)'. The diameter of the light ray striking the scanned surface 19 at this time is changed to a smaller diameter D(M)' as indicated in FIG. 2C.

Accordingly, in the second embodiment of the optical scanning apparatus in FIG. 2A, the deviation of the light spot diameter from the design value due to the production errors of the optical parts of the apparatus and due to the assembly errors thereof can be eliminated by adjusting the vertical width of the aperture of the first aperture unit 140 in the sub-scanning direction and adjusting the horizontal width of the aperture of the second aperture unit 110 in the main scanning direction.

In addition, in the optical scanning apparatus shown in FIG. 2A, the second aperture unit 110 and the adjusting unit 24 may be omitted. Such an optical scanning apparatus, in which the second aperture unit 110 and the adjusting unit 24 are omitted, is equivalent to the optical scanning apparatus in FIG. 1A, and accomplishes the functions which are the same as the functions (such as the adjustment of the sub-scanning-direction light spot diameter) of the apparatus in FIG. 1A.

The optical scanning apparatus in FIG. 2A further includes a control unit 25. The control unit 25 controls the operation of the adjusting unit 23 and controls the operation of the adjusting unit 24, so as to eliminate the variations of the widths of the apertures of the first and second aperture units 140 and 110 due to the curvature of field regarding the sub-scanning direction and due to the curvature of field regarding the main scanning direction.

Generally, the diameter of the light spot on the scanned surface of the photosensitive drum 20 varies in accordance with the curvature of field. The diameter of the light spot on the scanned surface in the main scanning direction varies in accordance with the curvature of the field with respect to the main scanning direction. The diameter of the light spot on the scanned surface in the sub-scanning direction varies in accordance with the curvature of the field with respect to the sub-scanning direction.

In order to reduce or eliminate the variations of the light spot diameter due to the curvature of field, the control unit 25 controls the operation of the adjusting unit 23 to adjust the vertical width of the aperture of the first aperture unit 140 and controls the operation of the adjusting unit 24 to adjust the horizontal width of the aperture of the second aperture unit 110. For example, the aperture widths of the first and second aperture units 140 and 110 are adjusted by means of the control unit 25 so as to increase the light ray diameters D(0S) and D(0M) at portions of the scanned surface where the light spot diameter becomes greater due to the curvature of field. The aperture widths of the first and second aperture units 140 and 110 are adjusted by means of the control unit 25 so as to decrease the light ray diameters D(0S) and D(0M) at portions of the scanned surface where the light spot diameter becomes smaller due to the curvature of field.

In order to carry out the above described control operations of the control unit 25, high-speed adjusting actions of the adjusting units 23 and 24 are needed. It is difficult to carry out the above control operations of the control unit 25 by means of the mechanism having the structure shown in FIG. 1D. Thus, in order to carry out the above control operations, it is necessary that the adjusting units 23 and 24 use piezoelectric elements or the like that can perform the high-speed adjusting actions.

When the aperture widths of the first and second aperture units 140 and 110 are fixed to constant values, the variations of the light spot diameters on the scanned surface in the main scanning direction and in the sub-scanning direction caused by the curvature of the field of the fΘ lens 18 can be defined as the functions of the image height H on the scanned surface.

In order to carry out the above described control operations of the control unit 25, approximate values of the aperture widths of the first and second aperture units 140 and 110 which correspond to the light spot diameters defined as the functions of the image height H are stored in a memory of the control unit 25.

Similarly to the first embodiment previously described, the optical scanning apparatus shown in FIG. 2A includes the photosensor 26 for outputting a sync signal. The sync signal of the photosensor 26 indicates the timing of the start of each main scanning on the photosensitive drum 20 by the light ray. By using a clock signal whose phase is synchronized to the sync signal output by the photosensor 26, the time of writing one dot to the photosensitive drum 20 is determined. The pixel clock on which the time of writing one dot to the photosensitive drum 20 is based is determined in accordance with the sync signal of the photosensor 26.

In the optical scanning apparatus shown in FIG. 2A, the pixel clock occurs at a rate corresponding to the image height H of the light spot on the scanned surface. The control unit 25 supplies the stored aperture width value of the first aperture unit 140, which value is in accordance with the image height H corresponding to the pixel clock, to the adjusting unit 23, so that the aperture width of the first aperture unit 140 is adjusted so as to maintain the diameter of the light spot in the sub-scanning direction at a constant value. The control unit 25 supplies the stored aperture width value of the second aperture unit 110, which value is in accordance with the image height H, to the adjusting unit 24, so that the aperture width of the second aperture unit 110 is adjusted so as to maintain the diameter of the light spot in the main scanning direction at a constant value.

FIG. 3 shows a modification of the optical scanning apparatus shown in FIGS. 2A through 2C. In FIG. 3, the parts which are the same as corresponding parts in FIGS. 1A and 2A are designated by the same reference numerals, and a description thereof will be omitted. The optical scanning apparatus in FIG. 3 includes the aperture unit 14, the second aperture unit 110, the adjusting unit 24, and a moving unit 222.

The moving unit 222 has a structure which is the same as the structure shown in FIG. 1D, and moves the aperture unit 14 relative to the light source 10 in the optical path direction. The adjusting unit 24 has a structure which is the same as the structure shown in FIG. 1D, and adjusts the horizontal width of the aperture of the second aperture unit 110 by moving the shading plates 111 and 112 in mutually opposite directions parallel to the main scanning direction.

In the optical scanning apparatus in FIG. 3, the deviation of the sub-scanning-direction light spot diameter from the design value due to the production errors of the optical parts and the assembly errors thereof can be eliminated by changing the position of the aperture unit 14 relative to the light source 10 in the optical path direction. Also, the deviation of the main-scanning-direction light spot diameter from the design value can be eliminated by adjusting the horizontal width of the aperture of the second aperture unit 110.

The optical scanning apparatus in FIG. 3 further includes the control unit 25. The control unit 25 controls the operation of the moving unit 222 so as to change the position of the aperture unit 14 relative to the light source 10 in the optical path direction, and controls the operation of the adjusting unit 24 so as to change the width of the aperture of the second aperture unit 110 in the main scanning direction.

The diameter of the light spot on the scanned surface in the main scanning direction varies in accordance with the curvature of the field with respect to the main scanning direction. The diameter of the light spot on the scanned surface in the sub-scanning direction varies in accordance with the curvature of the field with respect to the sub-scanning direction.

In order to reduce or eliminate the variations of the light spot diameter due to the curvature of field, the control unit 25 controls the operation of the moving unit 222 so as to change the position of the aperture unit 14 relative to the light source 10 in the optical path direction, and controls the operation of the adjusting unit 24 so as to change the horizontal width of the aperture of the second aperture unit 110 in the main scanning direction.

In the optical scanning apparatus shown in FIG. 3, the pixel clock occurs at a rate corresponding to the image height H of the light spot on the scanned surface. The control unit 25 supplies a stored displacement value of the aperture unit 14, which value is in accordance with the image height H corresponding to the pixel clock, to the moving unit 222, so that the position of the aperture unit 14 to the cylinder lens 12 is adjusted so as to maintain the diameter of the light spot in the sub-scanning direction at a constant value. The control unit 25 supplies the stored aperture width value of the second aperture unit 110, which value is in accordance with the image height H, to the adjusting unit 24, so that the aperture width of the second aperture unit 110 is adjusted so as to maintain the diameter of the light spot in the main scanning direction at a constant value.

Figure 4:
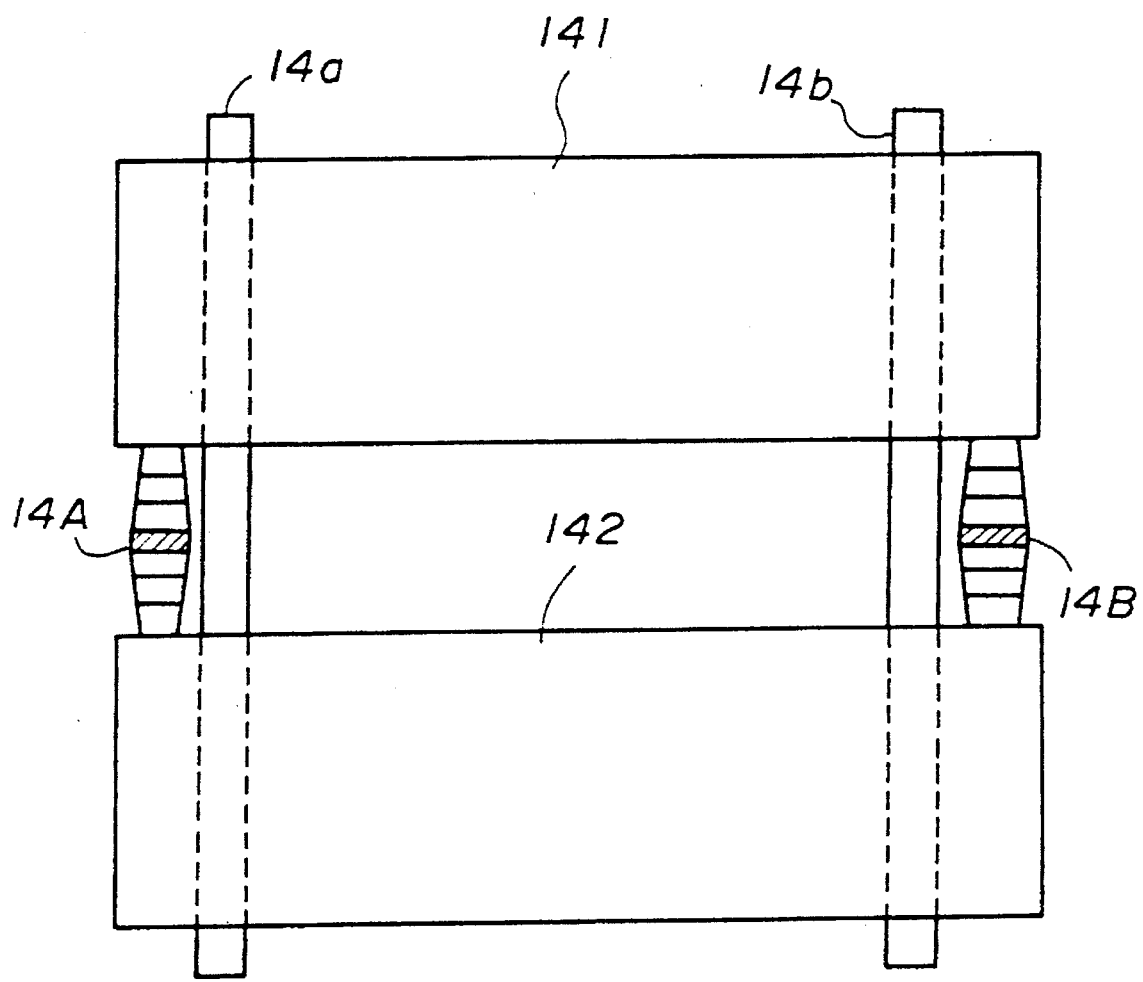
FIG. 4 is a diagram showing an adjusting unit for adjusting an aperture width of an aperture unit.
Figure 5:
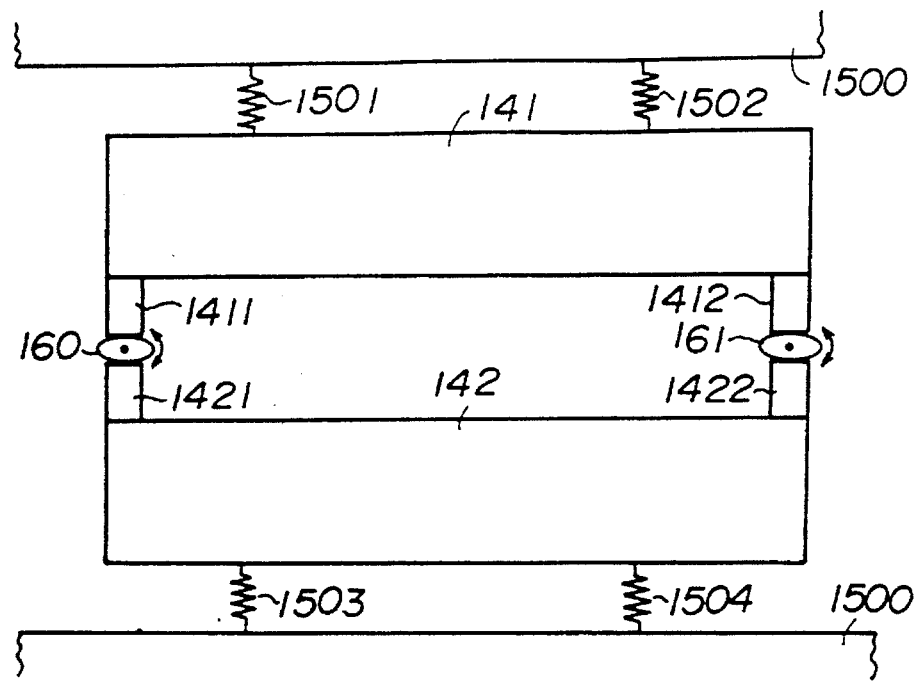
FIGS. 5, 6, 7A and 7B are diagrams showing various modifications of the adjusting unit in FIG. 4.
Figure 6:
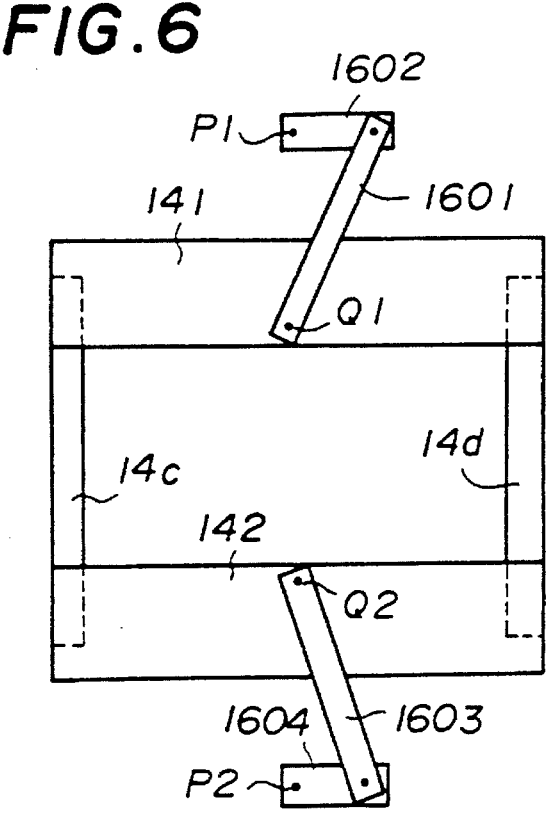

FIGS. 4 through 6 show various modifications of the adjusting units shown in FIG. 2A. As the adjusting units 23 and 24 in FIG. 2A have the same mechanism for moving two shading plates in mutually opposite directions, modifications of the adjusting unit 23 in FIG. 2A which moves the shading plates 141 and 142 of the first aperture unit 140 will be described with reference to FIGS. 4 through 6, for the sake of convenience.

FIG. 4 shows a modification of the adjusting unit 23 in FIG. 2A. In the aperture unit shown in FIG. 4, the shading plates 141 and 142 are mounted on two guide members 14a and 14b in a manner that the shading plates 141 and 142 are vertically movable along the two guide members 14a and 14b. As the mechanism for moving the shading plates in mutually opposite directions, piezoelectric elements 14A and 14B are arranged at end portions of the shading plates 141 and 142 between the shading plates. Central portions of the piezoelectric elements 14A and 14B are secured to fixed positions of the first aperture unit 140. Two end portions of each of the piezoelectric elements 14A and 14B are connected to the shading plates 141 and 142. In the adjusting unit in FIG. 4, it is possible to move the shading plates 141 and 142 in mutually opposite directions as the piezoelectric elements 14A and 14B are subjected to compression or expansion by applying drive signals to the piezoelectric elements 14A and 14B.

FIG. 5 shows still another modification of the adjusting unit 23 shown in FIG. 2A. In the aperture unit shown in FIG. 5, the shading plates 141 and 142 are mounted on guide members (not shown in FIG. 5) in a manner that the shading plates 141 and 142 are vertically movable along the two guide members 14a and 14b. In FIG. 5, a stationary member 1500 is provided within the optical scanning apparatus. Two compression springs 1501 and 1502 are arranged between the shading plate 141 and the stationary member 1500, and two compression springs 1503 and 1504 are arranged between the shading plate 142 and the stationary member 1500. The shading plates 141 and 142 are compressed in the approaching directions by the compression springs 1501 through 1504 so as to make the vertical width of the aperture of the aperture unit smaller. Four cam followers 1411, 1412, 1421 and 1422 are arranged at end portions of the shading plates 141 and 142 on the inward-facing surfaces.

As the mechanism for moving the shading plates 141 and 142 in mutually opposite directions, a first cam 160 is arranged between the two opposed, inward-facing surfaces of the cam followers 1411 and 1421, and a second cam 161 is arranged between the two opposed, inward-facing surfaces of the cam followers 1412 and 1422. The first and second cams 160 and 161 are of elliptic shape and have the respective rotating shafts fixed to the optical scanning apparatus. The first and second cams 160 and 161 are rotated in a synchronized manner around the respective rotating shafts in the same rotating direction by a cam rotating unit (not shown in FIG. 5). In the adjusting unit in FIG. 5, it is possible to move the shading plates 141 and 142 in mutually opposite vertical directions as the cam followers 1411, 1412, 1421 and 1422 are moved by the rotation of the first and second cams 160 and 161 when a drive signal is applied to the cam rotating unit.

FIG. 6 shows still another modification of the adjusting unit 23 shown in FIG. 2A. In the aperture unit shown in FIG. 6, the shading plates 141 and 142 are mounted on two guide members 14c and 14d in a manner that the shading plates 141 and 142 are vertically movable along the two guide members 14c and 14d. The adjusting unit in FIG. 6 uses two link mechanisms for moving the shading plates 141 and 142 in mutually opposite directions.

The adjusting unit in FIG. 6 includes two links 1601 and 1602 connected to the shading plate 141, and two links 1603 and 1604 connected to the shading plate 142. In one of the two link mechanisms, one end of the link 1601 is rotatably supported by a portion Q1 of the shading plate 141, and one end of the link 1602 is secured to a fixed portion P1 of the optical scanning apparatus. The other ends of the two links 1601 and 1602 are rotatably supported by each other. By rotating the link 1602 around the fixed portion P1, the shading plate 141 can be vertically moved due to a rocking movement of the link 1601.

In the other link mechanism, one end of the link 1603 is rotatably supported by a portion Q2 of the shading plate 142, and one end of the link 1604 is secured to a fixed portion P2 of the optical scanning apparatus. The other ends of the two links 1603 and 1604 are rotatably supported by each other. By rotating the link 1604 around the fixed portion P2, the shading plate 142 can be vertically moved due to a rocking movement of the link 1603.

In the adjusting unit in FIG. 6, it is possible to move the shading plates 141 and 142 in mutually opposite vertical directions by applying drive signals to link rotating units (not shown in FIG. 6) so as to rotate the links 1602 and 1604 in a synchronized manner and cause the rocking movements of the links 1601 and 1603. Thus, the width of the aperture of the aperture unit can be adjusted by the adjusting unit shown in FIG. 6.

Figure 7A:
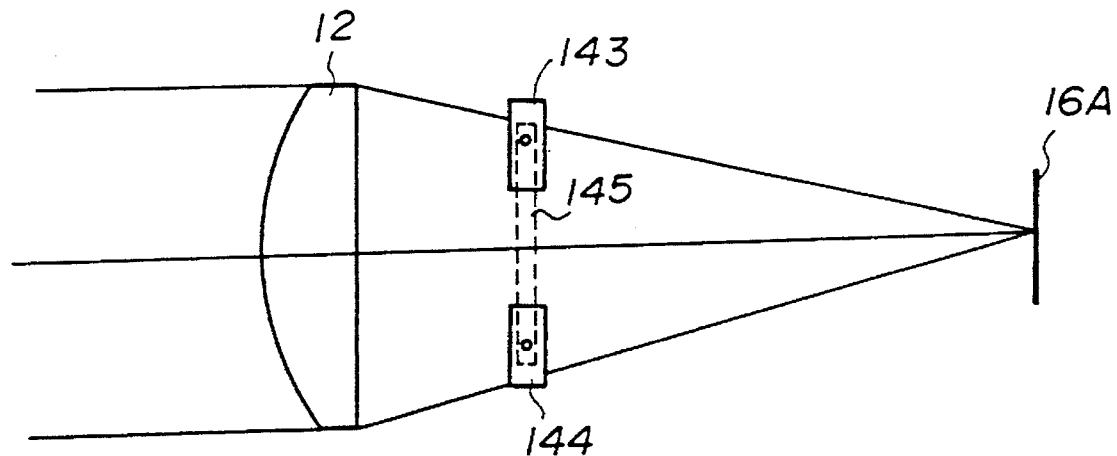

FIG. 7A shows a different modification of the adjusting unit 23 shown in FIG. 2A. The first aperture unit 140 includes shading plates 143 and 144, and the shading plates 143 and 144 are movably supported by a holding member 145. In the adjusting unit in FIG. 7A, it is possible to move the shading plates 143 and 144 in mutually opposite vertical directions by applying drive signals to plate moving units (not shown in FIG. 7A) so as to subject the shading plates 143 and 144 to rocking movement. Thus, the width of the aperture of the aperture unit can be adjusted by the adjusting unit shown in FIG. 7A.

Figure 7B:
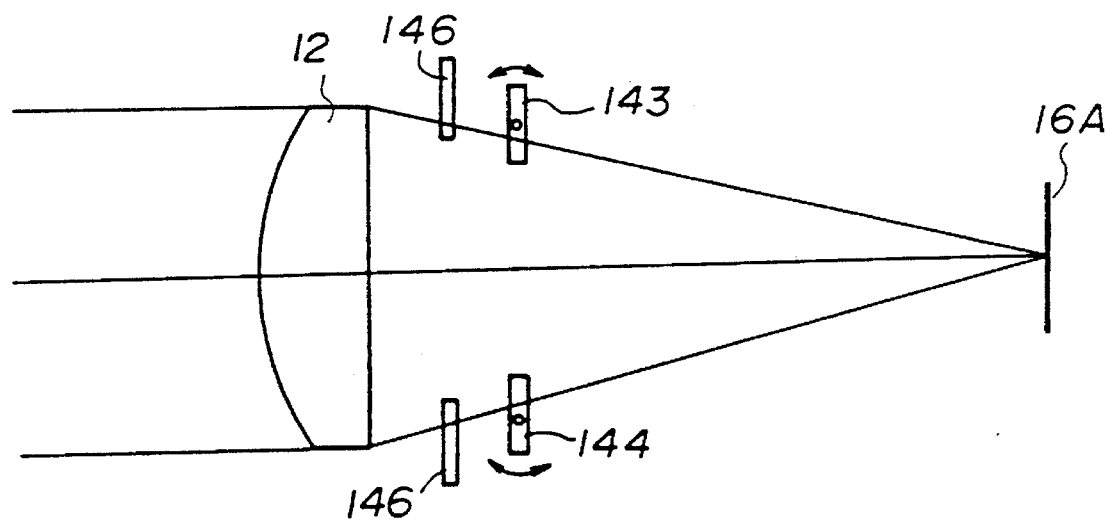

FIG. 7B shows a different modification of the adjusting unit 23 shown in FIG. 2A. The supporting unit shown in FIG. 7B includes the shading plates 143 and 144 movably supported by a holding member (not shown in FIG. 7B), and includes a fixed aperture unit 146 having an aperture whose diameter is set to the maximum permissible aperture diameter. The shading plates 143 and 144 are subjected to the rocking movements within the aperture of the fixed aperture unit 146 whose diameter is set to the maximum permissible aperture diameter.

In addition, it is necessary that the center of the aperture of the aperture unit 14 or the first aperture unit 140 is accurately aligned with the optical axis of the cylinder lens 12, and that the longitudinal direction of the aperture unit is accurately parallel to the main scanning direction. It is desirable that the position of the aperture unit 14 or the position of the first aperture unit 140 can be adjusted to the sub-scanning direction or around the optical axis of the cylinder lens 12.

Next, a description will be given, with reference to FIGS. 8 and 9, of a third embodiment of the optical scanning apparatus according to the present invention.

Figure 8:
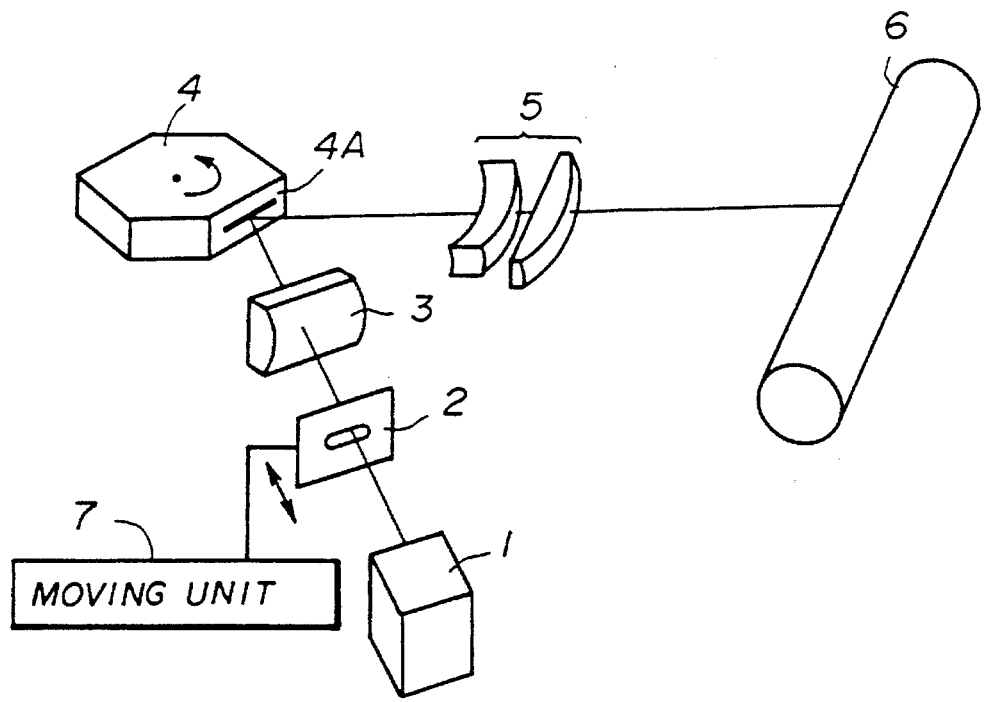
FIG. 8 is a diagram showing a third embodiment of the optical scanning apparatus according to the present invention.

FIG. 8 shows the third embodiment of the optical scanning apparatus. The optical scanning apparatus shown in FIG. 8 comprises a laser light source 1, an aperture unit 2, a cylinder lens 3, a rotary polygon mirror 4, an fΘ lens 5, a photosensitive drum 6, and a moving unit 7.

The laser light source 1 in FIG. 8 has a semiconductor laser and a coupling lens. The laser light source 1 emits a divergent laser light ray toward the polygon mirror 4 through the aperture unit 2 and the cylinder lens 3.

The aperture unit 2 has an aperture extending in a main scanning direction and blocks an outer peripheral portion of the light ray from the light source 1 with respect to the main scanning direction and the sub-scanning direction. The aperture unit 2 restricts a width of the light ray from the light source 1 in the sub-scanning direction to a sub-scanning-direction width of the aperture. Thus, only the inner portion of the light ray from the light source 1 enter the cylinder lens 3.

The cylinder lens 3 converts the light ray from the aperture unit 2 into a convergent light ray, and this convergent light ray converges only in the sub-scanning direction. As shown in FIG. 9, the light ray from the cylinder lens 3 converges only in the sub-scanning direction and remains unchanged in the main scanning direction.

The rotary polygon mirror 4 in FIG. 8 is an optical deflector having a reflection surface 4A for reflecting the incoming light toward the photosensitive drum 6. The reflection surface 4A is one of a plurality of surfaces of the polygon mirror 4, and the convergent light ray from the cylinder lens 3 strikes the reflection surface 4A. By means of the aperture unit 2, a line image is formed on the reflection surface 4A, and this line image extends in the main scanning direction. The optical deflector of the optical scanning apparatus in FIG. 4 may be a rotary polygon mirror, a galvano-mirror, or the like.

The light ray deflected by the polygon mirror 4 enters the fΘ lens 5 and is directed to the photosensitive drum 6. The fΘ lens 5 is an optical focusing unit for converting the light ray deflected from the polygon mirror 4 into a convergent light ray that is focused on the photosensitive drum 20 as a light spot. As the rotary polygon mirror 4 rotates in a rotating direction indicated by an arrow in FIG. 4, the deflected light ray scans the photosensitive drum 6 at a constant speed along a main scanning line that is parallel to the longitudinal axis of the photosensitive drum 6. The main scanning line is the trace of the light spot focused on the photosensitive drum 6 when the polygon mirror 4 rotates. An imaginary surface tangential to the photosensitive drum 6 on the main scanning line is called the scanned surface. The main scanning direction mentioned above corresponds to the direction of the main scanning line on the photosensitive drum 6.

The aperture unit 2 may be made from a thin metal sheet, and the aperture of the aperture unit 2 is formed by perforating the middle portion of the metal sheet. Alternatively, the aperture unit 2 may be made from a glass sheet, the glass sheet including a slit-like transparent portion in the middle of the glass sheet and a reflective opaque portion in the peripheral portion of the glass sheet. Such an aperture unit may be used instead in the optical scanning apparatus.

In the optical scanning apparatus in FIG. 8, the moving unit 7 moves the aperture unit 2 relative to the light source 1 in the optical path direction. Thus, the position of the aperture unit 2 relative to the light source 1 in the optical path direction is changed by the moving unit 7 so as to adjust the diameter of the light spot on the scanned surface of the photosensitive drum 6.

Figure 9:
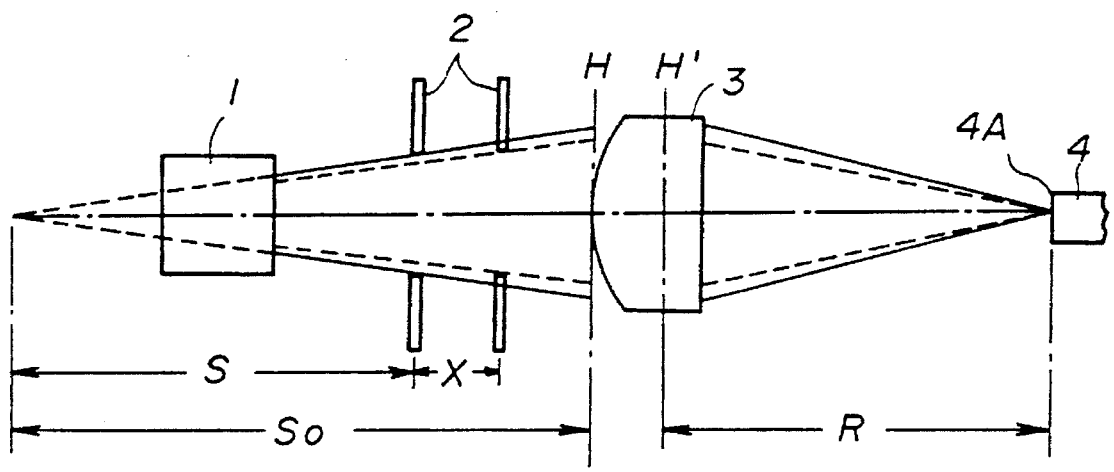
FIG. 9 is a diagram for explaining the change of a diameter of a light spot on a scanned surface by movement of an aperture unit.

FIG. 9 shows an optical path of the optical scanning apparatus in FIG. 8 from the laser light source 1 to the rotary polygon mirror 4. In the optical path, the sub-scanning direction corresponds to the vertical, up-down direction in FIG. 9.

The divergent laser light ray is emitted from the light source 1, passes through the aperture unit 2, and enters the cylinder lens 3. For the sake of convenience, in the case of the optical path in FIG. 9, an imaginary point source is located to the right of the light source 1, and the laser light ray is diverging from an object point of the point source. The light ray diverging from this object point passes through the aperture unit 2, and enters the cylinder lens 3.

When the aperture unit 2 is located at a first position near the light source 1, the distance from the above object point to the aperture unit 2 in the optical path direction is indicated by "S", the distance from the object point to a front principal point H of the cylinder lens 3 in the optical path direction is indicated by "So", and the distance from a rear principal point H' of the cylinder lens 3 to the reflection surface 4A of the polygon mirror 4 in the optical path direction is indicated by "R" in FIG. 9.

When the aperture unit 2 is located at the first position mentioned above, a diameter D1 of the light ray in the sub-scanning direction at the entry to the cylinder lens 3 is approximately represented by the formula: $D1=ds \cdot So/S$, where ds is the sub-scanning-direction width of the aperture of the aperture unit 2. The divergent light ray when the aperture unit 2 is located at the first position is indicated by solid lines in FIG. 9.

When the aperture unit 2 is moved away from the light source 1 to a second position near the cylinder lens 3 in the optical path direction, the displacement of the aperture unit 2 (or the distance from the first position to the second position in the optical path direction) is indicated by "X" in FIG. 9. A diameter D2 of the light ray in the sub-scanning direction at the entry to the cylinder lens 3 at this time is approximately represented by the formula: $D2=ds \cdot So/(S+X)$. The divergent light ray when the aperture unit 2 is located at the second position is indicated by dotted lines in FIG. 9.

The light ray striking the scanned surface of the photosensitive drum 6 has a diameter D(2S) on the scanned surface in the sub-scanning direction which diameter is represented as follows:

For the aperture unit 2 at the first position, $$D(2S)=K \cdot \beta \cdot l \cdot fcy/[\pi \cdot ds \cdot So/S] \qquad (1)$$

For the aperture unit 2 at the second position, $$D(2S)=K \cdot \beta \cdot l \cdot fcy/[\pi \cdot ds \cdot So/(S+X)] \qquad (2)$$

where β is the lateral magnification of the fΘ lens 18 with respect to the sub-scanning direction, fcy is the focal length of the cylinder lens 12 with respect to the sub-scanning direction, l is the wavelength of the laser light, and K is a given coefficient.

As being apparent from the above formulas, when the aperture unit 2 is moved away from the light source 1 in the optical path direction as great as the displacement X, the diameter D(2S) of the light ray striking the scanned surface in the sub-scanning direction changes in proportion to the value of X/S. Also, when the aperture unit 2 is moved as great as the displacement X, a diameter of the light ray striking the scanned surface in the main scanning direction changes in proportion to the value of X/S.

Accordingly, the diameters of the light spot on the scanned surface in the sub-scanning direction and in the main scanning direction can be changed by the same ratio by changing the position of the aperture unit relative to the light source in the optical path direction by means of the moving unit 7. By making use of this principle, it is possible to make adjustments of the diameter of the light spot on the scanned surface so as to eliminate the deviation of the light spot diameter from the design value.

Figure 10:
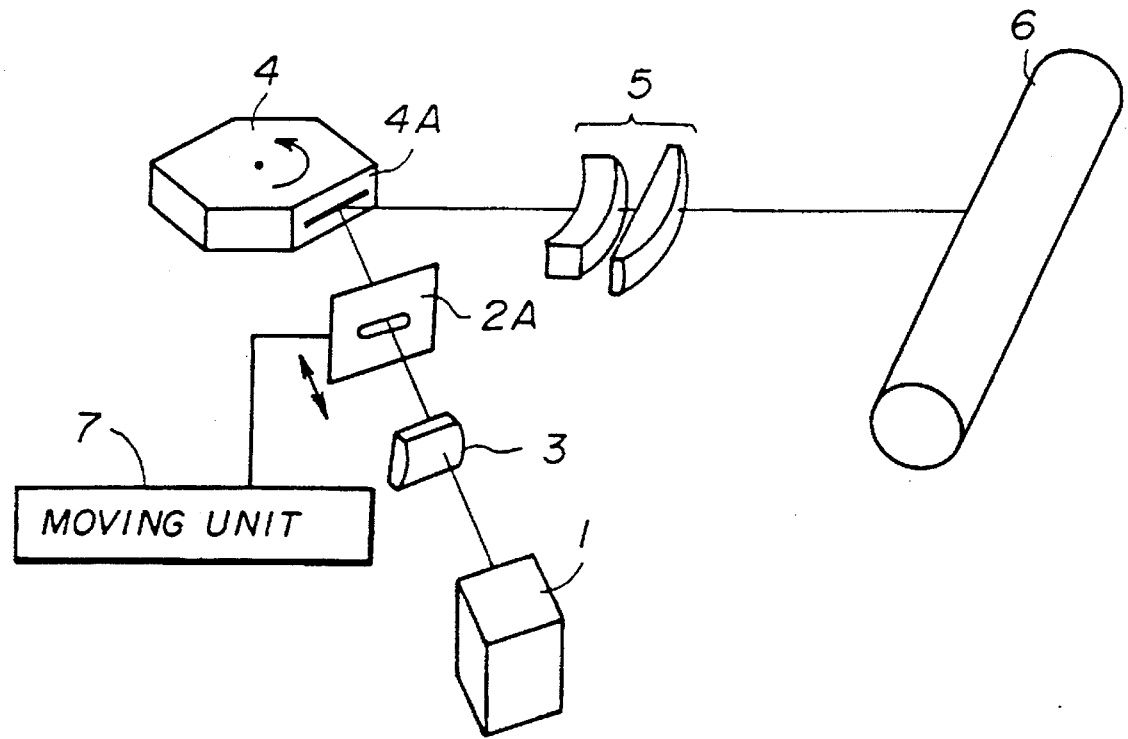
FIGS. 10 through 12 are diagrams showing various modifications of the optical scanning apparatus shown in FIG. 8.
Figure 11:
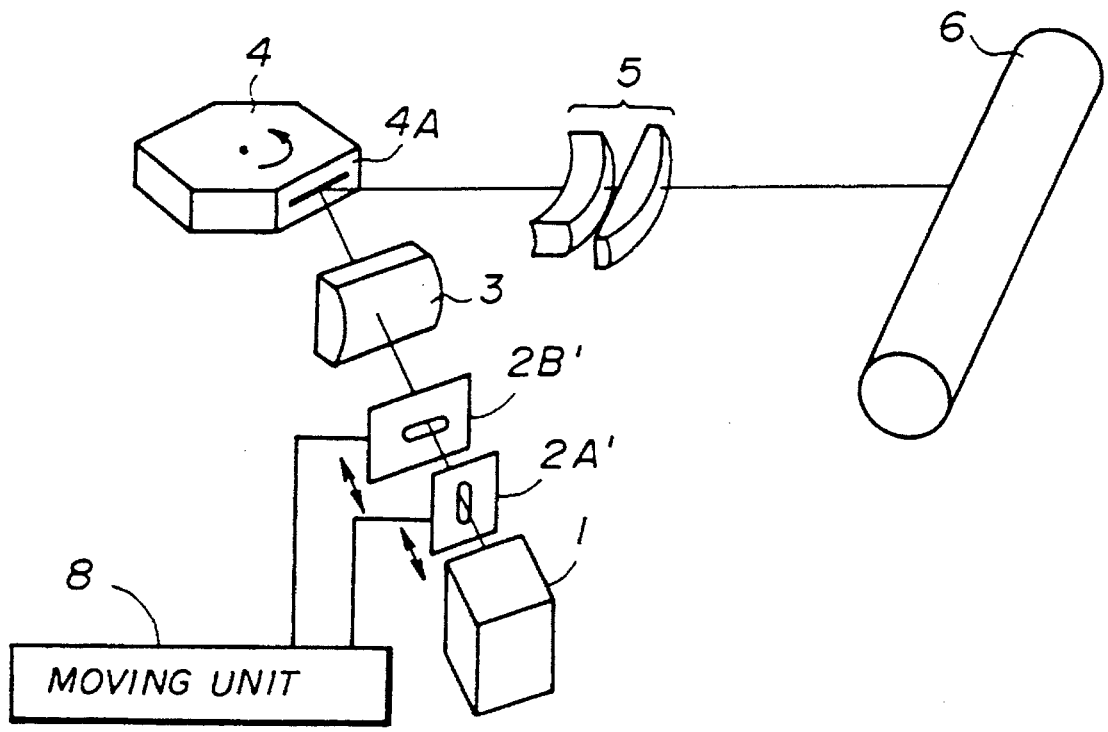
Figure 12:
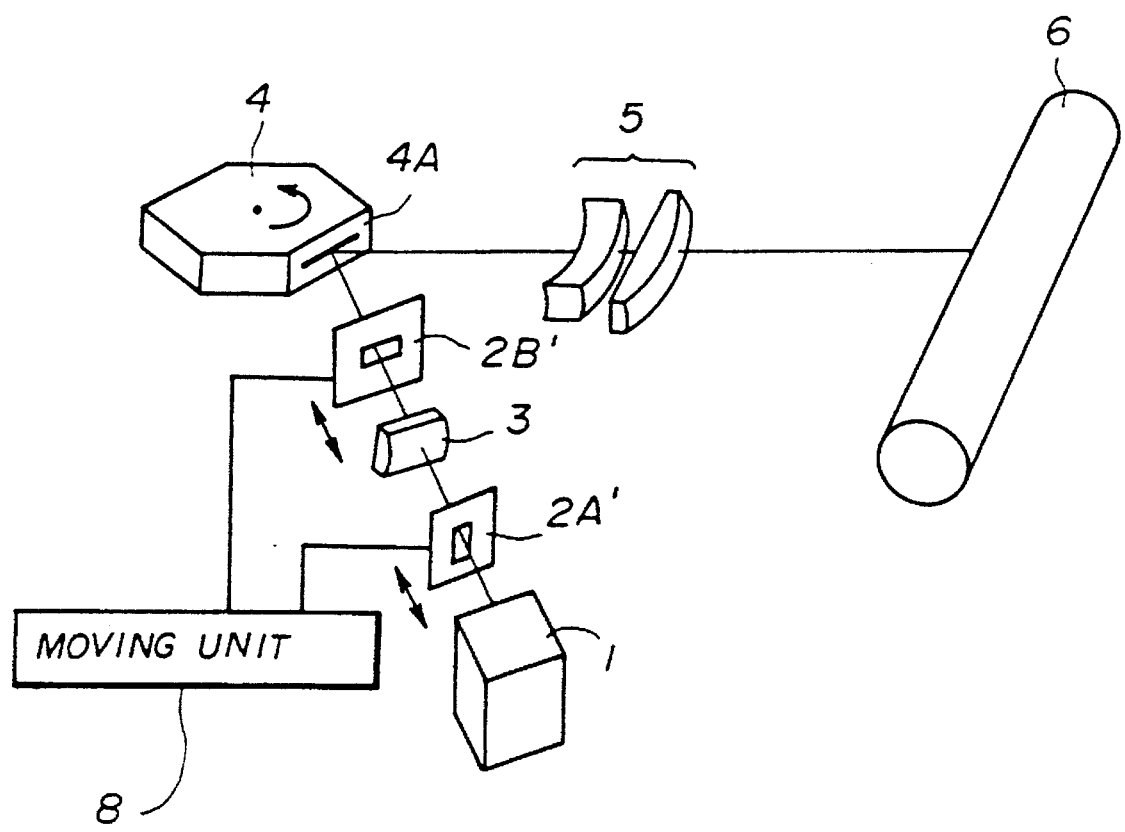

Next, a description will be given, with reference to FIGS. 10 through 12, of various modifications of the third embodiment of the optical scanning apparatus in FIG. 8. In FIGS. 10 through 12, the parts which are the same as corresponding parts in FIG. 8 are designated by the same reference numerals, and a description thereof will be omitted.

FIG. 10 shows a modification of the optical scanning apparatus shown in FIG. 8. The optical scanning apparatus in FIG. 10 is essentially the same as the optical scanning apparatus in FIG. 8 except that the laser light source 1 emits a convergent laser light ray, and that an aperture unit 2A is arranged between the cylinder lens 3 and the rotary polygon mirror 4.

As the light source 1 emits a convergent light ray in the optical scanning apparatus shown in FIG. 10, the distances S, used in the above mentioned formulas (1) and (2), with respect to the sub-scanning direction and with respect to the main scanning direction differ from each other. In the optical scanning apparatus in FIG. 10, the distance with respect to the main scanning direction is indicated by "Sp" and the distance with respect to the sub-scanning direction is indicated by "Sn". When the aperture unit 2 is moved in the optical path direction as great as the displacement X, the diameter of the light spot on the scanned surface in the main scanning direction changes in proportion to the value of X/Sp, and the diameter of the light spot on the scanned surface in the sub-scanning direction changes in proportion to the value of x/Sn.

In the optical scanning apparatus in FIG. 10, the diameters of the light spot on the scanned surface in the sub-scanning direction and in the main scanning direction can be changed by the same ratio by changing the position of the aperture unit 2A relative to the light source 1 in the optical path direction by means of the moving unit 7. By making use of this principle, it is possible to make adjustments of the diameter of the light spot on the scanned surface so as to eliminate the deviation of the light spot diameter from the design value.

In addition, if a divergent light ray is emitted from the light source 1 in the optical scanning apparatus in FIG. 10, the sub-scanning-direction diameter of the light spot on the scanned surface and the main-scanning-direction diameter thereof change in inverse proportion when the aperture unit 2A is moved relative to the light source 1. In the case of such an apparatus, it is difficult to adjust the diameter of the light spot on the scanned surface by the same ratio. Thus, the light source emitting a convergent light ray is needed by the optical scanning apparatus in FIG. 10.

FIG. 11 shows another modification of the optical scanning apparatus shown in FIG. 8. The optical scanning apparatus in FIG. 11 is essentially the same as the optical scanning apparatus in FIG. 8 except that two aperture units 2A' and 2B' are arranged between the light source 1 and the cylinder lens 3, and that the two aperture units 2A' and 2B' are moved relative to the light source 1 in the optical path direction by a moving unit 8 independently of each other.

The aperture unit 2A' has an aperture extending in the sub-scanning direction and having a certain amount of the width in the main scanning direction. The aperture unit 2A' blocks an outer peripheral portion of the light ray emitted from the light source 1 and restricts the width of the light ray in the main scanning direction to the main-scanning-direction width of its aperture.

The aperture unit 2B' has an aperture extending in the main scanning direction and having a certain amount of the width in the sub-scanning direction. The aperture unit 2B' blocks an outer peripheral portion of the light ray from the aperture unit 2A' and restricts the width of the light ray in the sub-scanning direction to the sub-scanning-direction width of its aperture.

The moving unit 8 moves the aperture unit 2A' relative to the light source 1 in the optical path direction so as to change the diameter of the light spot on the scanned surface in the main scanning direction. The moving unit 8 moves the aperture unit 2B' relative to the light source 1 in the optical path direction so as to change the diameter of the light spot on the scanned surface in the sub-scanning direction. The aperture units 2A' and 2B' are moved by the moving unit independently of each other.

In the optical scanning apparatus in FIG. 11, the diameters of the light spot on the scanned surface in the sub-scanning direction and in the main scanning direction can be changed independently of each other by changing the positions of the aperture units 2A' and 2B' relative to the light source 1 in the optical path direction by means of the moving unit 8. By making use of this principle, it is possible to make adjustments of the diameter of the light spot on the scanned surface so as to eliminate the deviation of the light spot diameter from the design value.

As described above, in the optical scanning apparatus in FIG. 10, the light source emitting a divergent light ray should not be used in order to easily and stably adjust the diameter of the light spot on the scanned surface. However, in the optical scanning apparatus in FIG. 11, the above described problem can be eliminated. As the diameters of the light spot in the sub-scanning direction and in the main scanning direction can be independently changed by the moving unit 8, it becomes possible to use either the light source emitting a convergent light ray or the light source emitting a divergent light ray.

FIG. 12 shows still another modification of the optical scanning apparatus shown in FIG. 8. The optical scanning apparatus in FIG. 12 is essentially the same as the optical scanning apparatus in FIG. 11 except that the aperture unit 2B' is arranged between the cylinder lens 3 and the polygon mirror 4.

Similarly to the apparatus in FIG. 11, the aperture unit 2A' is arranged between the light source 1 and the cylinder lens 3 in the optical scanning apparatus in FIG. 12. The moving unit 8 moves the aperture unit 2A' relative to the light source 1 in the optical path direction so as to change the diameter of the light spot in the main scanning direction. The moving unit 8 moves the aperture unit 2B' relative to the light source 1 in the optical path direction so as to change the diameter of the light spot in the sub-scanning direction. The aperture units 2A' and 2B' are moved by the moving unit 8 independently of each other. The operations of changing the diameters of the light spot in the main scanning direction and in the sub-scanning direction can be easily and stably performed, regardless of whether a convergent light ray or a divergent light ray is emitted from the light source 1.

Similarly to the optical scanning apparatuses in FIGS. 10 and 11, it is possible that the optical scanning apparatus in FIG. 12 make adjustments of the diameter of the light spot on the scanned surface so as to eliminate the deviation of the light spot diameter from the design value.

Figure 13A:
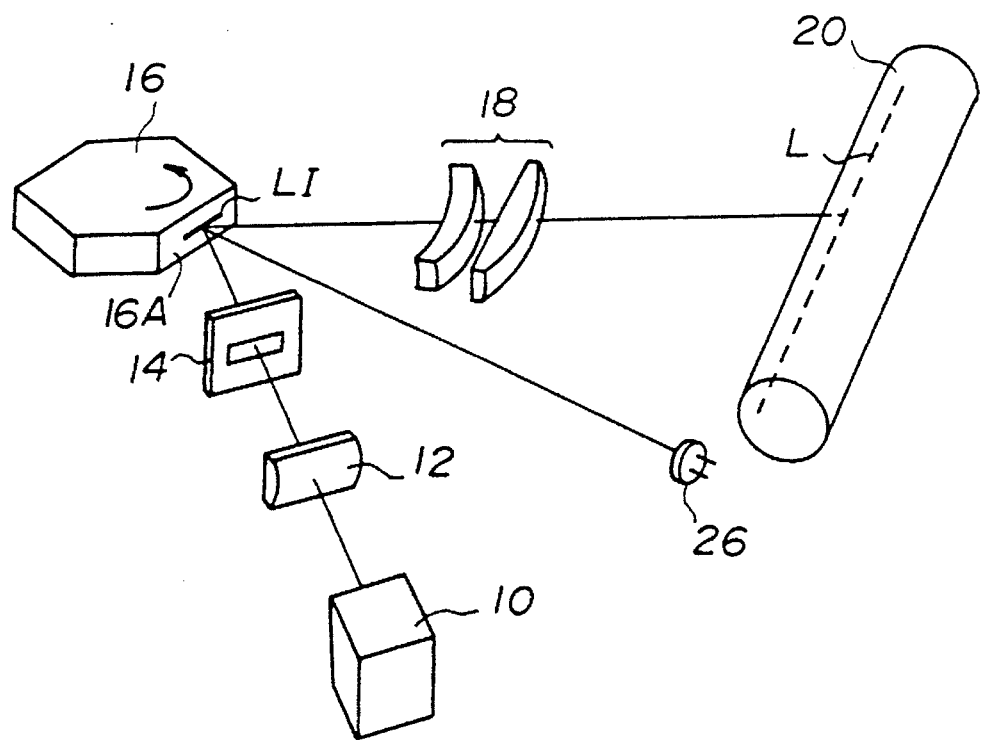
FIGS. 13A and 13B are diagrams showing a fourth embodiment of the optical scanning apparatus according to the present invention.
Figure 13B:
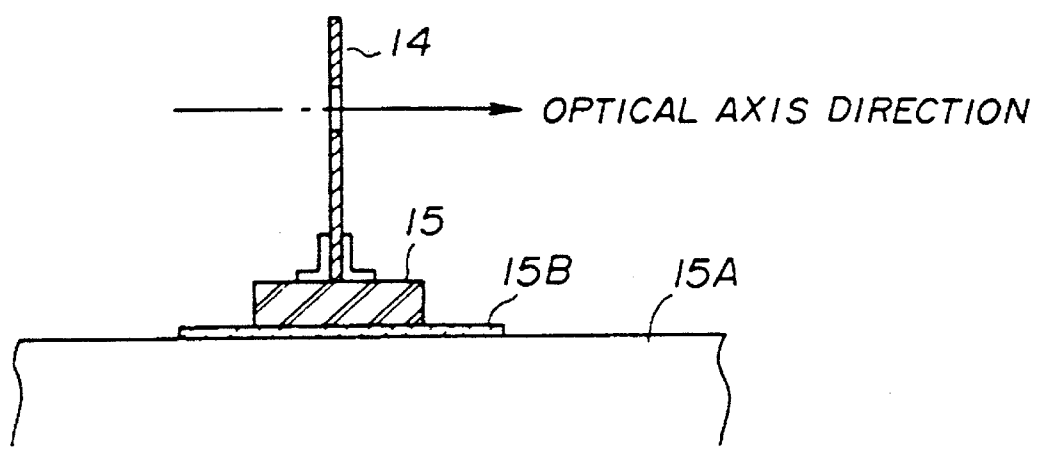

Next, a description will be given, with reference to FIGS. 13A and 13B, of a fourth embodiment of the optical scanning apparatus according to the present invention. In FIGS. 13A and 13B, the parts which are the same as corresponding parts in FIG. 1A are designated by the same reference numerals, and a description thereof will be omitted.

The optical scanning apparatus in FIG. 13A is essentially the same as the optical scanning apparatus in FIG. 1A except that the moving unit 22 for moving the aperture unit 14 is not provided.

The aperture unit 14 in FIG. 13A is arranged on the optical path between the cylinder lens 12 and the polygon lens 16, and the aperture unit 14 is fixed, by using a special adjustment procedure, to an appropriate position by which the diameter of the light spot on the scanned surface in the sub-scanning direction is adjusted to a desired diameter.

When the optical scanning apparatus in FIG. 13A is assembled, all the parts of the apparatus, other than the aperture unit 14, are arranged by paying attention to the alignments of the parts within the optical scanning apparatus. After the parts of the optical scanning apparatus are fixed, the position of the aperture unit 14 relative to the light source 10 on the optical path is set to an appropriate position in a manner shown in FIG. 13B.

In FIG. 13B, the aperture unit 14 is held by a holding member 15, and the holding member 15 is movably supported on a supporting member 15A which is stationary. Thus, the aperture unit 14 in this condition is supported on the supporting member 15A, and it is movable in the direction of the optical axis of the cylinder lens 12. By applying an ultraviolet ray curing resin to the surface of the supporting member 15A to form a thin layer 15B between the holding member 15 and the supporting member 15A.

When the layer 15B of the ultraviolet ray curing resin is in a non-cured condition, the position of the aperture unit 14 relative to the light source 10 on the optical path is changed, by moving the holding member 15, to an appropriate position by which the diameter of the light spot on the scanned surface in the sub-scanning direction is adjusted to a desired diameter. After the position of the aperture unit 14 is changed, the layer 15B of the ultraviolet ray curing resin is exposed to an ultraviolet ray. As the layer 15B of the ultraviolet ray curing resin is hardened, the aperture unit 14 is set to the appropriate position on the optical path.

Accordingly, in the thus assembled optical scanning apparatus, the deviation of the sub-scanning-direction light spot diameter from the design value due to the production errors of the optical parts and the assembly errors thereof can be eliminated. In this embodiment, the position of the aperture unit 14 relative to the light source 10 in the optical path direction is adjusted during an assembly process.

Figure 14A:
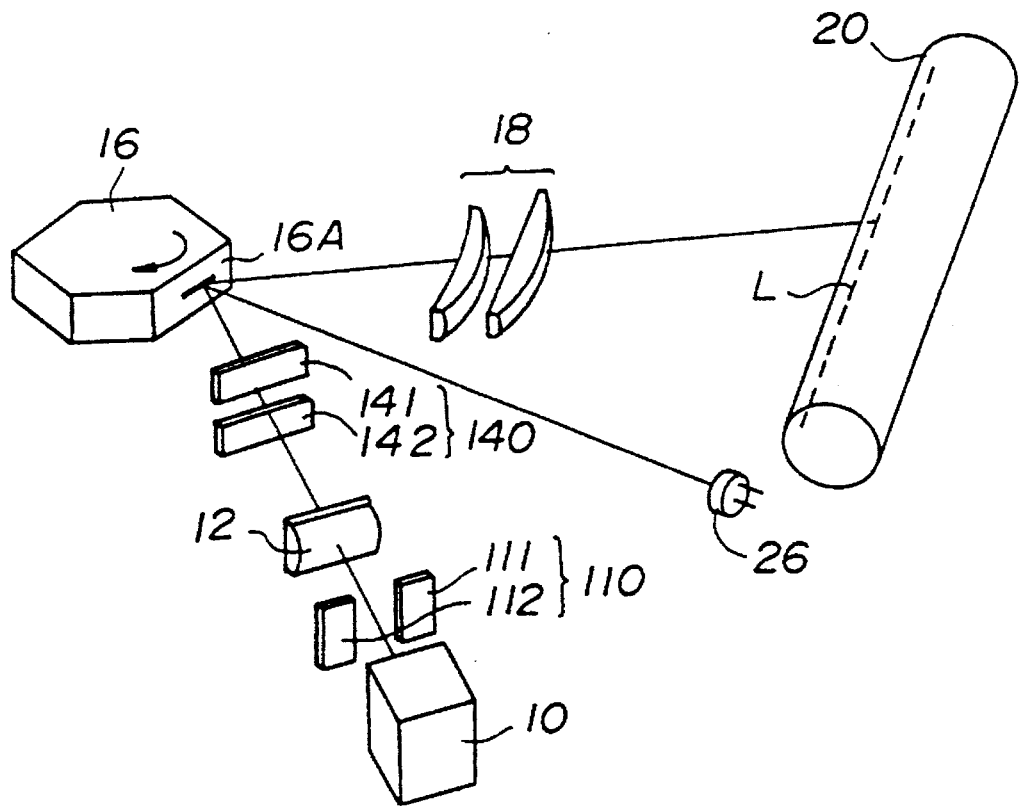
FIGS. 14A and 14B are diagrams showing a fifth embodiment of the optical scanning apparatus according to the present invention.

Next, a description will be given, with reference to FIGS. 14A, 14B and 15, of a fifth embodiment of the optical scanning apparatus according to the present invention. In FIGS. 14A and 15, the parts which are the same as corresponding parts in FIGS. 2A and 3 are designated by the same reference numerals, and a description thereof will be omitted.

The optical scanning apparatus in FIG. 14A differs from the optical scanning apparatus in FIG. 2A in that the adjusting unit 23 for moving the shading plates of the first aperture unit 140, the adjusting unit 24 for moving the shading plates of the second aperture unit 110, and the control unit 25 for controlling the operation of each of the adjusting units 23 and 24 are not provided.

In the optical scanning apparatus in FIG. 14A, the vertical width of the aperture of the first aperture unit 140 and the horizontal width of the aperture of the second aperture unit 110 are adjusted and fixed to appropriate widths in the sub-scanning direction and in the main scanning direction by using special adjustment procedures.

When the optical scanning apparatus in FIG. 14A is assembled, all the parts of the apparatus, other than the first aperture unit 140 and the second aperture unit 110, are arranged by paying attention to the alignments of the parts within the optical scanning apparatus. After the parts are fixed in the optical scanning apparatus, the vertical width of the aperture of the first aperture unit 140 and the horizontal width of the aperture of the second aperture unit 110 are adjusted and fixed to the desired widths in a manner shown in FIG. 14B. The adjustment procedures for both the first aperture unit 140 and the second aperture unit 110 are essentially the same, and only the adjustment procedure for the second aperture unit 110 is shown in FIG. 14B for the sake of convenience.

Figure 14B:
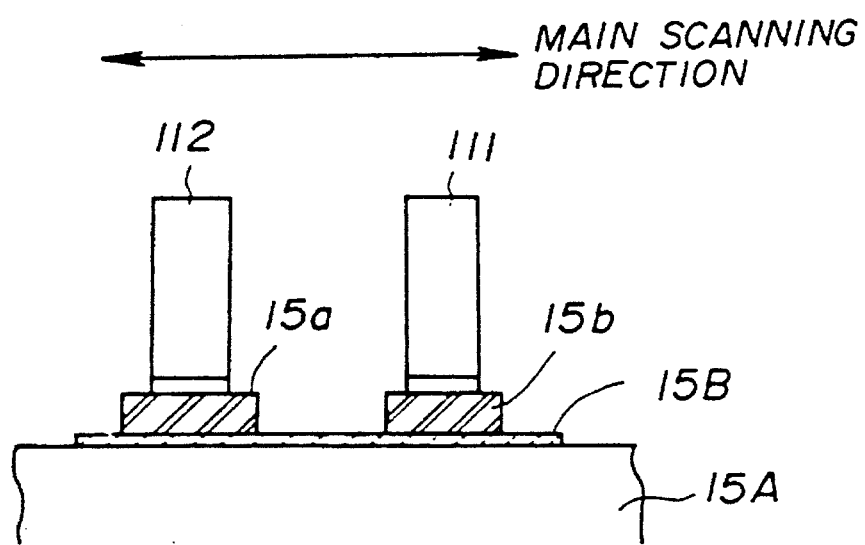
Figure 15:
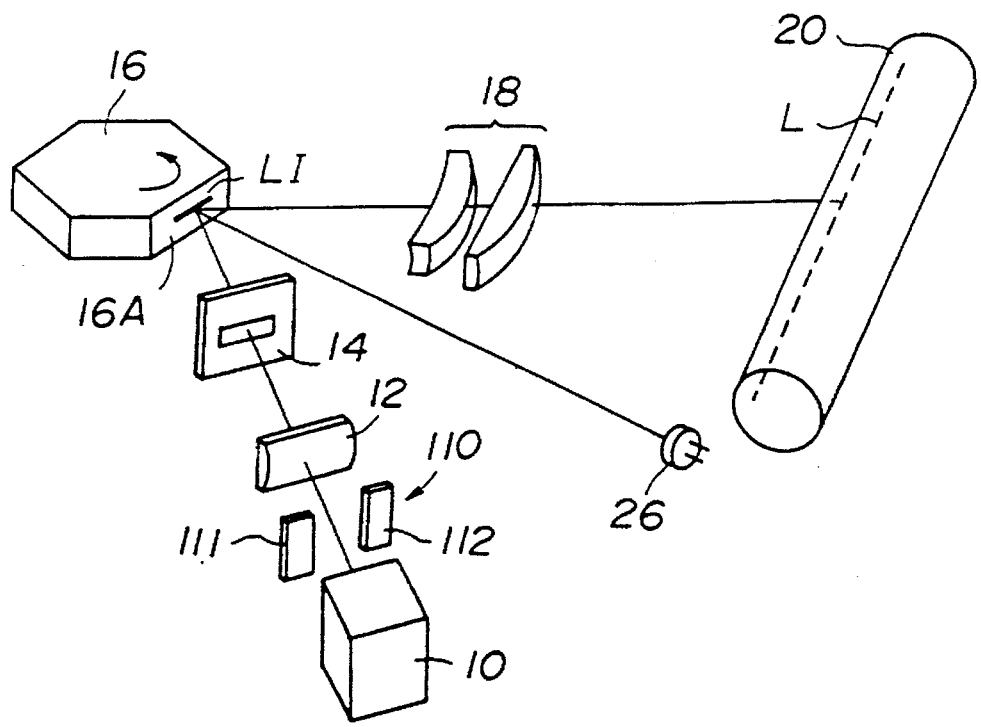
FIG. 15 is a diagram showing a modification of the optical scanning apparatus shown in FIGS. 14A and 14B.

In FIG. 14B, the shading plates 111 and 112 of the second aperture unit 110 are held by two holding members 15a and 15b respectively. The holding members 15a and 15b are movably supported on the supporting member 15A. The shading plates 111 and 112 are supported on the supporting member 15A, and they are movable in the main scanning direction which is perpendicular to the optical path. By applying the ultraviolet ray curing resin to the surface of the supporting member 15A to form the thin layer 15B between the holding members 15a and 15b and the supporting member 15A.

When the layer 15B of the ultraviolet ray curing resin is in a non-cured condition, the horizontal width of the aperture of the second aperture unit 110 is changed, by moving the shading plates 111 and 112 in mutually opposite directions parallel to the main scanning direction, to a first width by which the diameter of the light spot in the sub-scanning direction is adjusted to a desired diameter. After the horizontal width of the aperture of the second aperture unit 110 is changed, the layer 15B of the ultraviolet ray curing resin is exposed to an ultraviolet ray. As the layer 15B of the ultraviolet ray curing resin is hardened, the horizontal width of the aperture of the second aperture unit 110 is fixed to the first width.

The adjustment procedure for the first aperture unit 140 is performed in a manner similar to the above manner. By performing a similar adjustment procedure, the vertical width of the aperture of the first aperture unit 140 can be adjusted and fixed to a second width by which the diameter of the light spot on the scanned surface in the sub-scanning direction is adjusted to a desired diameter. A suitable jig may be used in order to carry out the above adjustment procedures more easily and more accurately.

In the thus assembled optical scanning apparatus, the deviation of the light spot diameter from the design value due to the production errors and the assembly errors can be eliminated. In this embodiment, the vertical width of the aperture of the first aperture unit 140 and the horizontal width of the aperture of the second aperture unit 110 can be adjusted to the first and second widths during the assembly process.

FIG. 15 shows a modification of the optical scanning apparatus shown in FIGS. 14A and 14B. The optical scanning apparatus in FIG. 15 is essentially the same as the optical scanning apparatus in FIG. 3 except that the moving unit 222, the adjusting unit 24 and the control unit 25 are not provided in the apparatus in FIG. 15.

The aperture unit 14 in FIG. 15 is arranged between the cylinder lens 12 and the polygon lens 16, and it is fixed, by using the adjustment procedure shown in FIG. 13B, to an appropriate position by which the diameter of the light spot on the scanned surface in the sub-scanning direction is adjusted to a desired diameter. The second aperture unit 110 in FIG. 15 is arranged between the light source 10 and the cylinder lens 12, and the horizontal width of the aperture of the second aperture unit 110 is fixed, by using the adjustment procedure shown in FIG. 14B, to the first width by which the diameter of the light spot on the scanned surface in the main scanning direction is adjusted to a desired diameter.

When the optical scanning apparatus in FIG. 15 is assembled, all the parts of the apparatus other than the aperture unit 14 and the second aperture unit 110, are arranged by paying attention to the alignments of the parts within the optical scanning apparatus. After the parts are fixed in the optical scanning apparatus, the position of the aperture unit 14 on the optical path is adjusted and fixed to the desired position in the manner shown in 13B, and the vertical width of the aperture of the second aperture unit 110 is adjusted and fixed to the desired width in the manner shown in FIG. 14B.

Figure 16:
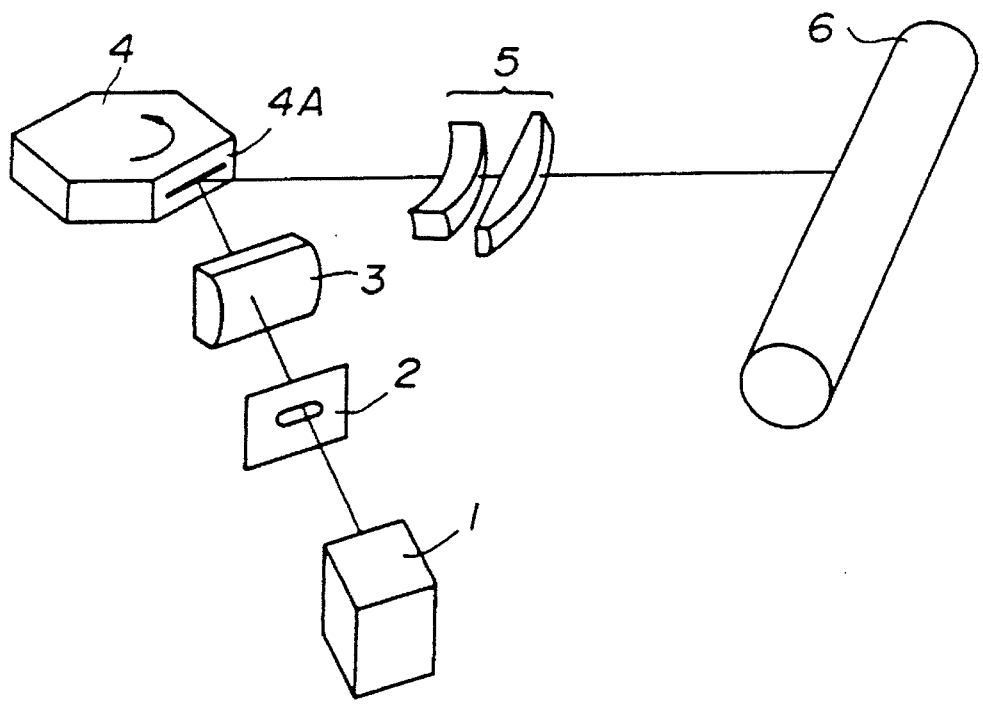
FIG. 16 is a diagram showing a sixth embodiment of the optical scanning apparatus according to the present invention.

FIG. 16 shows a sixth embodiment of the optical scanning apparatus according to the present invention. The optical scanning apparatus in FIG. 16 is essentially the same as the optical scanning apparatus in FIG. 8 except that the moving unit 7 for moving the aperture unit 2 is not provided in the apparatus in FIG. 16.

The aperture unit 2 in FIG. 16 is arranged on the optical path between the light source 1 and the cylinder lens 3, and it is fixed, by using the adjustment procedure shown in FIG. 13B, to an appropriate position by which the diameter of the light spot on the scanned surface in the sub-scanning direction is adjusted to a desired diameter. After all the parts of the apparatus in FIG. 16, other than the aperture unit 2, are assembled by paying attention to the alignments of the parts, the position of the aperture unit 2 on the optical path is adjusted and fixed to the appropriate position in the manner shown in FIG. 13B.

Figure 17:
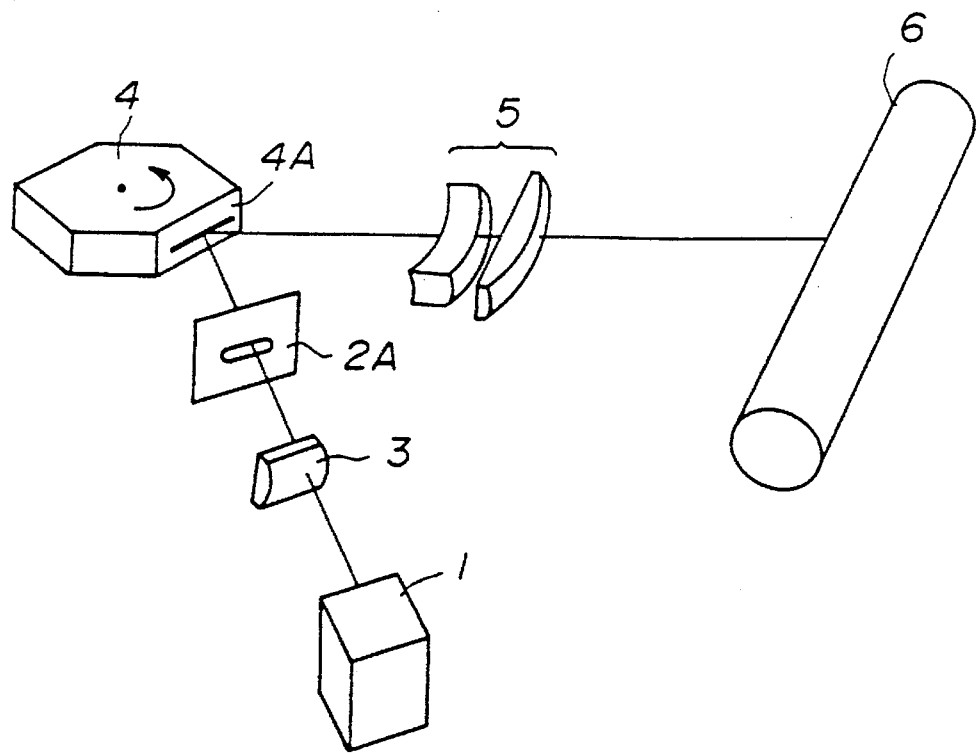
FIGS. 17 through 19 are diagrams showing various modifications of the optical scanning apparatus shown in FIG. 16.

FIG. 17 shows a modification of the optical scanning apparatus shown in FIG. 16. The optical scanning apparatus in FIG. 17 is essentially the same as the optical scanning apparatus in FIG. 10 except that the moving unit 7 for moving the aperture unit 2A is not provided in the apparatus in FIG. 17.

The aperture unit 2A in FIG. 17 is arranged on the optical path between the cylinder lens 3 and the polygon mirror 4, and the aperture unit 2A is fixed, by using the adjustment procedure shown in FIG. 13B, to a position by which the diameter of the light spot on the scanned surface in the sub-scanning direction is adjusted to a desired diameter. After all the parts of the apparatus in FIG. 17, other than the aperture unit 2A, are assembled by paying attention to the alignments of the parts, the position of the aperture unit 2A on the optical path is adjusted and fixed in the manner shown in FIG. 13B.

Figure 18:
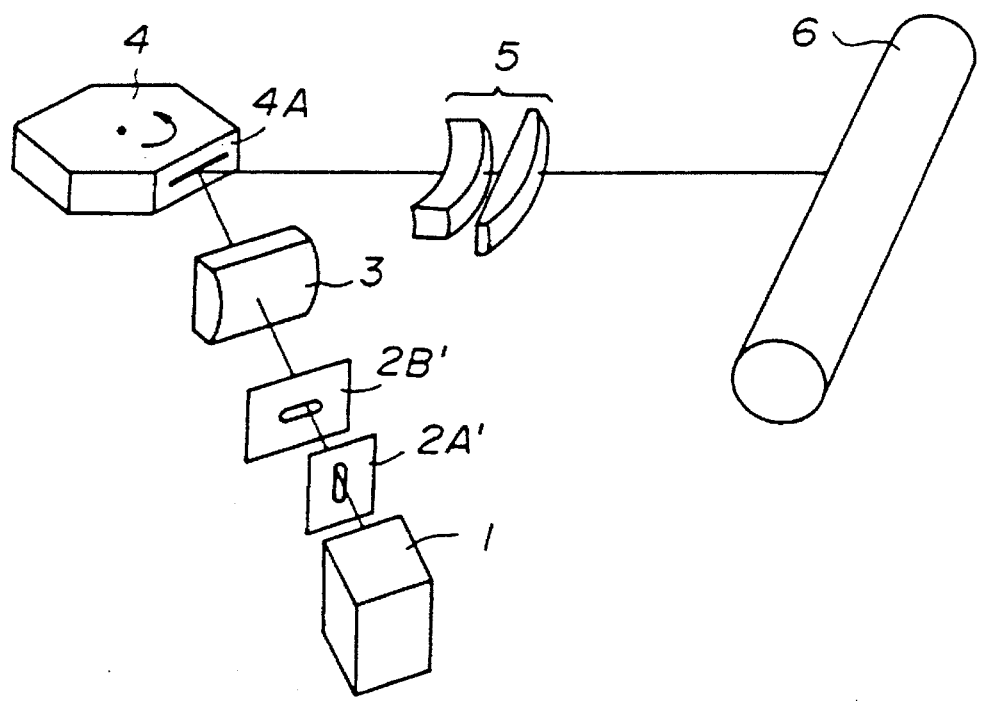

FIG. 18 shows another modification of the optical scanning apparatus shown in FIG. 16. The optical scanning apparatus in FIG. 18 is essentially the same as the optical scanning apparatus in FIG. 11 except that the moving unit 8 for moving the aperture unit 2A' and the aperture unit 2B' independently of each other is not provided.

The aperture units 2A' and 2B' in FIG. 18 are arranged on the optical path between the light source 1 and the cylinder lens 3, and they are fixed, by using the adjustment procedure shown in FIG. 13B, to appropriate positions by which the diameters of the light spot on the scanned surface in the sub-scanning direction and in the main scanning direction are adjusted to desired diameters. After all the parts of the apparatus in FIG. 16, other than the aperture unit 2, are assembled by paying attention to the alignments of the parts, the positions of the aperture units 2A' and 2B' on the optical path are adjusted and fixed in the manner shown in FIG. 13B.

Figure 19:
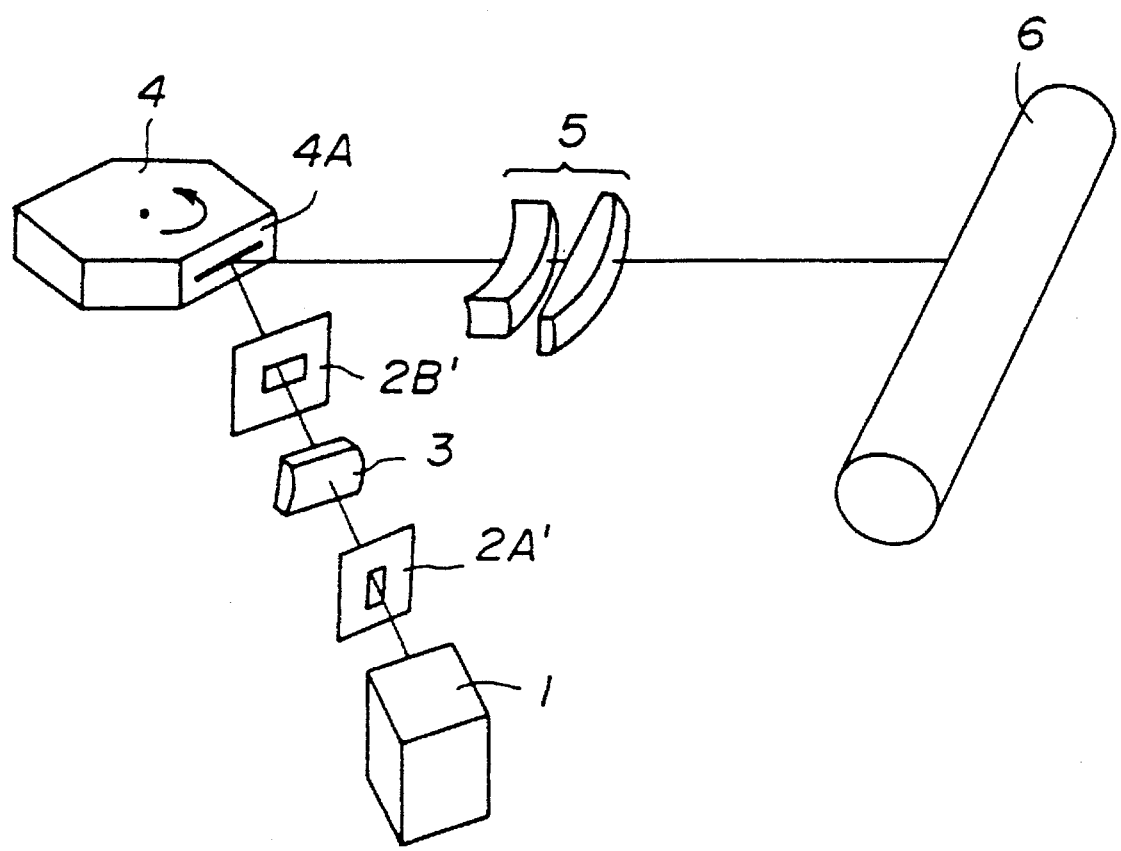

FIG. 19 shows still another modification of the optical scanning apparatus shown in FIG. 16. The optical scanning apparatus in FIG. 19 is essentially the same as the optical scanning apparatus in FIG. 12 except that the moving unit 8 for moving the aperture unit 2A' and the aperture unit 2B' independently of each other is not provided.

The method of arranging and fixing the aperture units 2A' and 2B' for the optical scanning apparatus shown in FIG. 19 is essentially the same as the method of arranging and fixing the aperture units 2A' and 2B' for the optical scanning apparatus shown in FIG. 18 described above.

The aperture unit 2A' in FIG. 19 is arranged on the optical path between the light source 1 and the cylinder lens 3, and it is fixed, by using the adjustment procedure shown in FIG. 13B, to an appropriate position by which the diameter of the light spot on the scanned surface in the sub-scanning direction is adjusted to a desired diameter.

Further, the present invention is not limited to the above described embodiments, and variations and modifications may be made without departing from the scope of the present invention.

What is claimed is:

1. An optical scanning apparatus comprising:

at least one cylinder lens positioned between a laser light source and an optical deflector, wherein said cylinder lens converts laser light rays emitted from the light source into a first convergent light ray, such that light rays emitted from the light source are converged in a sub-scanning direction and remain unchanged in a main scanning direction, and wherein said optical deflector deflects the first convergent light ray from said at least one cylinder lens;

at least one focusing lens positioned between said optical deflector and a photosensitive drum such that said at least one focusing lens converts the deflected light ray deflected by said optical deflector into a second convergent light ray, said second convergent light ray converging in the main scanning direction, and wherein said at least one focusing lens focuses said second convergent light ray on a scanned surface of a photosensitive drum as a light spot; and a movable light restricting member positioned between said at least one cylinder lens and said optical deflector, said movable light restricting member being movable along an axis substantially parallel to an optical axis of said first convergent light ray and having an aperture for changing a width of said first convergent light ray and a width of said light spot in said sub-scanning direction in response to movement of said light restricting member.

2. An optical scanning apparatus according to claim 1, further comprising a second movable light restricting member positioned between said at least one cylinder and the laser light source, said second movable light restricting member having an aperture to block an outer portion of the laser light from said light source in the sub-scanning direction and to restrict a width of the light emitted from the light source in the main scanning direction, said second light restricting member being movable along an axis substantially parallel to said optical axis so as to selectively change the width of said light emitted from the light source in said main scanning direction.

3. An optical scanning apparatus according to claim 2, further comprising an adjusting member connected to said light restricting member, said adjusting member including a guide member, a support member movably secured to said guide member and configured to support said light restricting member in aligned relation to said optical axis, and a guide moving unit coupled to said guide member and configured to move said support member along said optical axis.

4. An optical scanning apparatus according to claim 3, further comprising a second adjusting member connected to said second light restricting member, said second adjusting member including a second guide member, a second support member movably secured to said second guide member and configured to support said second light restricting member in aligned relation to said optical axis, and a second guide moving unit coupled to said second guide member and configured to move said second support member along said optical axis.

5. An optical scanning apparatus according to claim 4, wherein said first adjusting member and said second adjusting member move said first and second support members, respectively, relative to the light source along the optical axis independently of each other so as to adjust the diameter of the light spot on said scanned surface of said photosensitive drum in both the sub-scanning direction and the main scanning direction.

6. An optical scanning apparatus comprising:

light source means for emitting a laser light ray;

cylinder lens means for conveying the laser light ray from said light source means into a first convergent light ray, said first convergent light ray converging only in a sub-scanning direction and remaining unchanged in a main scanning direction;

deflection means for deflecting the first convergent light ray from said cylinder lens means;

focusing means for conveying the deflected light ray deflected by said deflection means into a second convergent light ray, said second convergent light ray converging in the main scanning direction, and for focusing said second convergent light ray on a scanned surface as a light spot;

first aperture means, arranged between said light source means and said deflection means, for blocking an outer peripheral portion of the laser light ray from said light source means, and for restricting a width of the laser light ray in the sub-scanning direction to a width of a first aperture of said first aperture means;

first adjusting means for adjusting the width of the first aperture of said first aperture means in the sub-scanning direction, so as to change a diameter of the light spot on the scanned surface in the sub-scanning direction;

second aperture means, arranged between said light source means and said deflection means, for restricting a width of the laser light ray in the main scanning direction to a width of a second aperture of said second aperture means; and second adjusting means for adjusting the width of the second aperture of the second aperture means in the main scanning direction by moving said second aperture means relative to said light source in an optical path direction, so as to change a diameter of the light spot on the scanned surface in the main scanning direction.

7. An optical scanning apparatus according to claim 6, further comprising control means for controlling operation of said first adjusting means and operation of said second adjusting means so as to eliminate variations of the widths of the first and second apertures of the first and second aperture means due to a curvature of field regarding the sub-scanning direction and due to a curvature of field regarding the main scanning direction.

8. An optical scanning apparatus according to claim 6, wherein said first aperture means comprises a pair of shading plates which are arranged movably in mutually opposite directions parallel to the sub-scanning direction.

9. An optical scanning apparatus according to claim 8, wherein said first adjusting means moves the shading plates of said first aperture means in the mutually opposite directions parallel to the sub-scanning direction so as to adjust a sub-scanning-direction distance between said shading plates of said first aperture means.

10. An optical scanning apparatus according to claim 8, wherein said first adjusting means comprises a pair of piezoelectric elements connected to said shading plates of said first aperture means.

11. An optical scanning apparatus according to claim 8, wherein said first adjusting means comprises a pair of cams and two sets of cam followers, each set of said cam followers connected to one of said cams and connected to said shading plates of the first aperture means.

12. An optical scanning apparatus according to claim 8, wherein said first adjusting means comprises a pair of link mechanisms connected to said shading plates of said first aperture means.

13. An optical scanning apparatus according to claim 6, wherein a position of said first aperture means relative to said light source means and a position of said second aperture means relative to said light source means are set to appropriate positions on an optical path between said light source means and said deflection means after said light source means, said cylinder lens means, said deflection means, and said focusing means are arranged and fixed within the optical scanning apparatus, said position of said first aperture means relative to said light source means being appropriate for eliminating the deviation of the diameter of the light spot from the design value with respect to the sub-scanning direction, and said position of said second aperture means relative to said light source means being appropriate for eliminating the deviation of the diameter of the light spot from the design value with respect to the main scanning direction.

14. An optical scanning apparatus comprising:

light source means for emitting a laser light ray;

cylinder lens means for converting the laser light ray from said light source means into a first convergent light ray, said first convergent light ray converging only in a sub-scanning direction and remaining unchanged in a main scanning direction;

deflection means for deflecting the first convergent light ray from said cylinder lens means;

focusing means for conveying the deflected light ray deflected by said deflection means into a second convergent light ray converging in the main scanning direction, and for focusing said second convergent light ray on a scanned surface as a light spot;

first aperture means, arranged between said light source means and said deflection means, for changing a width of the laser light ray in the sub-scanning direction;

moving means for moving said first aperture means relative to said light source in an optical path direction so as to change the width of the laser light ray in the sub-scanning direction in response to movement of said first aperture means;

second aperture means, arranged between said light source means and said deflection means, for changing a width of the laser light ray in the main scanning direction; and adjusting means for adjusting a width of an aperture of the second aperture means so as to change a diameter of the light spot on the scanned surface in the main scanning direction.

15. An optical scanning apparatus according to claim 14, further comprising control means for controlling operation of said first adjusting means and operation of said second adjusting means so as to eliminate variations of the widths of the first and second apertures of the first and second aperture means due to a curvature of field regarding the sub-scanning direction and due to a curvature of field regarding the main scanning direction.

16. An optical scanning apparatus according to claim 14, wherein said first aperture means comprises an aperture unit including a fixed aperture for restricting the width of the first convergent light ray in the sub-scanning direction, said aperture unit being movably arranged between said cylinder lens and said deflection means, and said fixed aperture extending in the main scanning direction and having a given width in the sub-scanning direction.

17. An optical scanning apparatus according to claim 14, wherein said second aperture means comprises a pair of shading plates which are arranged movably in mutually opposite directions parallel to the main scanning direction, and wherein said second adjusting means moves the shading plates of said second aperture means in the mutually opposite directions parallel to the main scanning direction so as to adjust a main-scanning-direction distance between said shading plates.

18. An optical scanning apparatus according to claim 14, wherein a position of said first aperture means relative to said light source means and a position of said second aperture means relative to said light source means are set to appropriate positions on an optical path between said light source means and said deflection means after said light source means, said cylinder lens means, said deflection means, and said focusing means are arranged and fixed within the optical scanning apparatus, said position of said first aperture means relative to said light source means being appropriate for eliminating the deviation of the diameter of the light spot from the design value with respect to the sub-scanning direction, and said position of said second aperture means relative to said light source means being appropriate for eliminating the deviation of the diameter of, the light spot from the design value with respect to the main scanning direction.

* * * * *